United States Patent
Furui et al.

(10) Patent No.: US 9,562,994 B2
(45) Date of Patent: *Feb. 7, 2017

(54) ANTIGLARE SHEET FOR IMAGE DISPLAY DEVICE, MANUFACTURING METHOD THEREOF, METHOD OF IMPROVING BLACK TINT AND IMAGE SHARPNESS OF AN IMAGE DISPLAY DEVICE USING SAID ANTIGLARE SHEET AND SUITED FOR USE WITH BOTH MOVING IMAGES AND STILL IMAGES

(75) Inventors: Gen Furui, Tokyo (JP); Makoto Honda, Tokyo (JP); Takashi Kodama, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 14/236,825

(22) PCT Filed: Sep. 3, 2012

(86) PCT No.: PCT/JP2012/072305
§ 371 (c)(1),
(2), (4) Date: Feb. 3, 2014

(87) PCT Pub. No.: WO2013/035656
PCT Pub. Date: Mar. 14, 2013

(65) Prior Publication Data
US 2014/0177060 A1    Jun. 26, 2014

(30) Foreign Application Priority Data
Sep. 5, 2011  (JP) ................................ 2011-193097

(51) Int. Cl.
G02B 5/02       (2006.01)
G02F 1/1335   (2006.01)
G02B 1/115    (2015.01)

(52) U.S. Cl.
CPC ............. *G02B 5/0226* (2013.01); *G02B 1/115* (2013.01); *G02B 5/0221* (2013.01); *G02F 1/133502* (2013.01)

(58) Field of Classification Search
CPC ......... G02B 5/0226; G02B 1/10; G02B 1/115; G02B 5/0221; G02F 1/133502
(Continued)

(56) References Cited

U.S. PATENT DOCUMENTS 6,164,785 A * 12/2000 Maekawa ..................... 359/613
6,771,336 B2 * 8/2004 Tatsuta et al. ................ 349/112
(Continued)

FOREIGN PATENT DOCUMENTS

CN    101128753    2/2008
CN    101341427    1/2009
(Continued)

OTHER PUBLICATIONS

International Search Report for PCT/JP2012/072305, dated Dec. 4, 2012.
Office Action issued Apr. 8, 2016 in corresponding Taiwanese Application No. 101132393.

*Primary Examiner* — Scott J Sugarman
*Assistant Examiner* — Kristina Deherrera
(74) *Attorney, Agent, or Firm* — Wenderoth, Lind & Ponack, L.L.P.

(57) ABSTRACT

The purpose of this invention is to achieve a video display device antiglare sheet having excellent black glossiness, darkness in dark places, and antiglare properties in video applications, and suited to realizing high image quality. The antiglare layer comprising a transparent resin and diffusion particles is provided on at least one surface of a transparent substrate. The antiglare layer is uneven on the surface opposite of the transparent substrate, said unevenness being formed mainly by convexities resulting from the diffusion
(Continued)

particles, and the diffusion particles have an impregnation layer formed from the impregnation of the transparent resin. The brightness values and the transmission intensities about the antiglare sheet satisfy specific relational expressions.

7 Claims, 9 Drawing Sheets

(58) Field of Classification Search
USPC .......................................... 359/599, 601–614
See application file for complete search history.

(56) References Cited

U.S. PATENT DOCUMENTS

2008/0137206 A1*  6/2008  Nakamura et al. ............ 359/601
2010/0283945 A1* 11/2010  Kodama et al. ................ 349/96

FOREIGN PATENT DOCUMENTS

| | | |
|---|---|---|
| JP | 2002-267818 | 9/2002 |
| JP | 2006-81089 | 3/2006 |
| JP | 2006-106290 | 4/2006 |
| JP | 2006-189658 | 7/2006 |
| JP | 2007-17626 | 1/2007 |
| JP | 2007-264113 | 10/2007 |
| JP | 2007-334294 | 12/2007 |
| JP | 2008-32845 | 2/2008 |
| JP | 2010-060924 | 3/2010 |
| JP | 2010-060925 | 3/2010 |
| JP | 2010-122710 | 6/2010 |
| JP | 2010-128255 | 6/2010 |
| TW | 200413748 | 8/2004 |
| TW | 200916836 | 4/2009 |
| WO | 2011/129367 | 10/2011 |

* cited by examiner

ANTIGLARE SHEET FOR IMAGE DISPLAY DEVICE, MANUFACTURING METHOD THEREOF, METHOD OF IMPROVING BLACK TINT AND IMAGE SHARPNESS OF AN IMAGE DISPLAY DEVICE USING SAID ANTIGLARE SHEET AND SUITED FOR USE WITH BOTH MOVING IMAGES AND STILL IMAGES

TECHNICAL FIELD

The present invention relates to an antiglare sheet for an image display device, that has excellent vivid complexion and blackness, blackness in dark surroundings and antiglare properties for dynamic images, and that is suited for realizing high image quality, to a method for producing it, and to a method for improving vivid complexion and blackness and image crispness in image display devices suited for both dynamic images and still images, using the antiglare sheet.

BACKGROUND ART

In image display devices such as cathode ray tube (CRT) displays, liquid crystal displays (LCD), plasma displays (PDP) and electroluminescence displays (ELD), the outermost surfaces are generally provided with optical laminates for anti-reflection. Such optical laminates for anti-reflection minimize virtual image formation and reduce reflectance by diffusion and interference of light.

One type of known optical laminate for anti-reflection is an antiglare film having an irregularly shaped antiglare layer formed on the surface of a transparent base material. The antiglare film can diffuse external light and prevent reduction in visibility caused by external light reflection or virtual image formation, by the irregular shape of the surface.

An example of a known conventional antiglare film is one wherein a resin containing a filler such as silicon dioxide (silica) is coated on the surface of a transparent base material film to form an antiglare layer (see PTLs 1 and 2, for example).

Such antiglare films include types in which irregular shapes are formed on the surface of the antiglare layer by aggregation of particles such as cohesive silica, types in which an organic filler is added to the resin to form irregular shapes on the layer surface, and types in which a film having irregularities on the layer surface is laminated to transfer the irregular shapes.

All such types of conventional antiglare films are designed to produce a light diffusing and antiglare effect by the action of the surface form of the antiglare layer, and require a greater number of irregular shapes to increase the antiglare property, but when the irregularities are increased, this raises the haze value of the coating film, causing discoloration and concomitantly lowering the contrast.

As the opportunity to view displays with high image quality movies and the like have increased in homes as well, there is increased demand for blackness of black screens in dark rooms (hereunder referred to as "blackness in dark surroundings").

The haze exhibited by surface irregularities is defined as the "surface haze" while the haze exhibited when smoothing has been performed using a resin that forms surface irregularities, or a resin with a difference in refractive index of at least 0.02 from such a resin, is defined as the "internal haze", and these are measured according to JIS K 7136.

The haze value, or the ratio of the internal haze and total haze, is commonly used as a simple method for evaluating contrast. Specifically, it has been considered that an optical sheet with low contrast reduction can be produced by specifying the materials and controlling the production conditions in the optical sheet production process, in order to control the haze value (see PTLs 1 to 3).

However, contrast can differ even with the same haze value, and even with production using the haze value and the ratio of the internal haze and total haze as indexes, for example, it is not always possible to stably obtain a satisfactory antiglare sheet for an image display device.

In addition, it has been attempted to lower the reflectance by additionally providing a low-refraction interference layer on the antiglare layer, but this requires precise formation of a film of about 100 nm, and is extremely expensive.

Furthermore, in recent years a variety of different kinds of viewing environments have appeared due to the diffusion and wider evolution of various types of delivery systems including one-seg, and the performance required for antiglare sheets has become ever more wide-ranging and personalized.

For example, with increasing opportunities for movie appreciation and the like, there is increasing demand for reproduction of dynamic images with high image quality in dark rooms, in order to experience a high-level viewing environment equivalent to that of a movie theatre, while as mobile usage continues to increase, there is also demand for image quality with physical strength and satisfactory balance between dynamic images and still images in light rooms, in order to bring out still images and dynamic images in the bright outdoors.

In other words, the image quality required for display terminals varies, and it is desired to develop an antiglare sheet for an image display device having performance suitable for the viewing environment.

PTL 4 and 5 indicate examples where the requirements differ depending on the viewing environment, and teach that still images and dynamic images have different requirements for performance, as well as different viewing conditions by observers.

As a result of diligent research on the problems described above, the present inventors have found that the sum of the internal diffusion and surface diffusion alone that has been considered in the prior art does not account for the total haze, but that in addition to the internal diffusion and surface diffusion, the total haze is also affected by the positional relationship between the diffusion particles and the surface irregularities.

The present inventors have also found, as a result of conducting diligent research on the performance required by antiglare sheets for image display devices suited both for high blackness in dark rooms and in light rooms and for high-level dynamic images and still images, such as for liquid crystal display devices (hereunder these will also be referred to simply as "for liquid crystal display devices"), and that in order to obtain a high level of blackness in dark rooms it is necessary to exhibit diffusion properties of a nature such that virtually no "stray light component" is produced, a factor that has not been considered in the past. The term "stray light component" refers to any of the uncontrollable light components traveling in directions inside the antiglare sheet different from the intended direction, among light impinging into the interior of the antiglare sheet, due to diffusion factors present on the surface of and/or inside the antiglare sheet, and it is usually reflected repeatedly inside the antiglare sheet.

It was also found that in order to obtain satisfactory image quality for viewing, it is important to sufficiently provide the regular reflection component of external light, which in the past has only been an object of prevention, while also considering the stray light components of projected light for dynamic images and still images in a light room.

In other words, in regard to the stray light components, when dark sections (for example, black) and light sections (for example, white) are present in the same screen, projected light in the light sections partially presents as stray light due to diffusion factors in the optical sheet, not only producing "flares", or light emitted from dark sections, and lowering contrast, and especially reducing dark room contrast, but also causing loss of stereoscopic quality and resulting in images with poor planar variation.

The stray light component has minimal influence when viewing from the front, and tends to have a stronger influence when viewing from oblique directions.

In regard to the regular reflection component of external light, it was found that an optical film with extremely low regular reflection causes images to be perceived as simulated images, being subject to human sensory characteristics, whereas an optical film with an appropriate regular reflection component presents clear images and tends to result in their perception as actual objects, increasing the unique gloss and luminance of images on a dynamic image screen, to produce images with a sense of motion.

Such performance that includes contrast, a stereoscopic visual effect and sense of motion, that are required for such dynamic images (for example, for a scene with a youth under a blue sky, the black hair displayed on the screen is smooth black, the black pupils are moist black, and the skin is visible with the vivid brilliance characteristic of youth) will be referred to as "vivid complexion and blackness".

Moreover, in recent years, there is a demand for antiglare sheets for liquid crystal display devices with excellent "blackness in dark surroundings", which is a degree of notable, high-level blackness under high-level viewing conditions, such as for film appreciation, or in other words, viewing under dark room conditions without external light, and in the optimal range of the display device (a viewing range that allows viewing with a front luminance of 33.3% or greater).

In addition, for film viewing under illumination, or for mobile purposes, a property of preventing unwanted reflection (an antiglare property) is desired even for viewing of dynamic images. An antiglare property for dynamic images is a property that is not completely free of virtual images, but rather slightly prevents unwanted reflection, where the outlines and borderlines of objects on borders and backgrounds are slightly palated for an observer observing the dynamic images.

Still images must have excellent contrast and greater prevention of unwanted reflection, and such performance of contrast and prevention of unwanted reflection required for still images will be referred to as "image crispness".

In other words, there is an increased preference that antiglare sheets for liquid crystal display devices should have excellent vivid complexion and blackness and image crispness.

Evaluation of image quality has included the "black tightness" mentioned in PTL 6 and "glazed black feel", mentioned in PTL 7.

In order to improve narrowness of angle, which is a fundamental defect in liquid crystal displays, antiglare sheets are often provided with diffusibility. However, providing diffusibility can lower contrast, especially for frontal viewing.

Black tightness is evaluated as a compromise between viewing angle enlargement and contrast, and by comparing blackness during power-off and blackness during power-on (black images) directly from the front of the display, with a more intense blackness being evaluated as a more powerful tight feel for the screen.

In addition to stray light components that are very weak in the front and more noticeable at greater oblique angles, in a liquid crystal display system structure the light leaking from the liquid crystal display unit itself (leaked light) is present even during black display, and therefore the blackness during power-on, as seen directly from the front, is the level of blackness resulting from a combination of this leaked light and external light reflection, while blackness during power-off is the blackness with only from external light reflection, since no projected light is present.

Stated differently, "black tightness" means an intense level of blackness against both external light and leaked light, without considering the stray light components, unlike the aforementioned vivid complexion and blackness, and also without consideration of an appropriate necessary level for the regular reflection component, and therefore even if the contrast is high, the gloss and luminance of the image is inferior, no sense of motion is produced, and the vivid complexion and blackness is not increased. In particular, since increasing diffusion and widening the viewing angle are a priority, stray light components are easily produced and the blackness in dark surroundings tends to be reduced.

Furthermore, a "glazed black feel" is black reproducibility when an image display device displays black in a light room environment, i.e., abundant expression of graded black, by minimizing diffusion of the non-regular reflected light component of light incident to the optical laminate from the exterior, preventing non-regular reflected light from reaching the eye of the observer, and visual evaluation is made under three band fluorescence, after attachment to a cross nicol polarizing plate or a black acrylic board via an acrylic pressure-sensitive adhesive for optical films (product with total light transmittance: ≥90%, haze: ≤0.5%, film thickness: 10 to 55 µm, such as the MHM Series by Nichiei Kakoh Co., Ltd., or trade name: "L8010" by Hitachi Chemical Co., Ltd.) on the side opposite the film side of an optical laminate.

That is, with this measurement method, evaluation of dynamic images is not performed and the effect of stray projected light components is completely ignored. Therefore, even with high gloss and luminance, no dark room contrast or stereoscopic visual effect is produced, and the vivid complexion and blackness is not increased.

"Contrast" is the ratio of white luminance to black luminance, and since the absolute value of black luminance is much smaller than the white luminance, the effect of black luminance on contrast is greater. In order to obtain images with excellent contrast, it is necessary to have excellent "black tightness", as blackness for a wide viewing angle, "blackness in dark surroundings" as the absolute blackness, and "glazed black feel" as abundant graded expression in the black region (hereinafter referred to as "excellent black reproducibility").

Also, in order to present both still images and dynamic images, it is necessary to exhibit excellence at least in terms of vivid complexion and blackness with a stereoscopic visual effect and sense of motion.

In PTLs 8 and 9, which limit the diffusion property of antiglare sheets, the contrast is satisfactory, but no consideration is given to the issues of physical performance including adhesiveness and hard coat properties, which are indispensable for practical use, or glare and presentation of both dynamic images and still images, and therefore sufficient performance has not been exhibited.

CITATION LIST

Patent Literature

PTL 1: Japanese Unexamined Patent Application Publication No. 2002-267818
PTL 2: Japanese Unexamined Patent Application Publication No. 2007-334294
PTL 3: Japanese Unexamined Patent Application Publication No. 2007-17626
PTL 4: Japanese Unexamined Patent Application Publication No. 2006-81089
PTL 5: Japanese Unexamined Patent Application Publication No. 2006-189658
PTL 6: Japanese Unexamined Patent Application Publication No. 2007-264113
PTL 7: Japanese Unexamined Patent Application Publication No. 2008-32845
PTL 8: Japanese Unexamined Patent Application Publication No. 2010-60924
PTL 9: Japanese Unexamined Patent Application Publication No. 2010-60925

SUMMARY OF INVENTION

Technical Problem

In light of this situation, it is an object of the present invention to provide an antiglare sheet for an image display device such as a cathode ray tube (CRT) display, liquid crystal display (LCD), plasma display (PDP), electroluminescence display (ELD) or the like, that does not employ a low refraction interference layer, that has particularly excellent high-level blackness, vivid complexion and blackness and black glaze in dark surroundings, that has an antiglare property for dynamic images tolerable for dynamic image purposes, and that is suitable for practical use.

Specifically, it is an object of the invention to provide an antiglare sheet for an image display device, that has excellent vivid complexion and blackness, blackness in dark surroundings and antiglare properties for dynamic images, and that is suited for realizing high image quality, to a method for producing it, and to a method for improving vivid complexion and blackness and image crispness in image display devices suited for both dynamic images and still images, using the same.

Solution to Problem

A trade-off exists between viewing angle and image quality in liquid crystal displays, for example. In the past, liquid crystal television sets have had a narrow viewing angle, which has been considered a drawback from the viewpoint of substitution for isotropic CRTs, and larger viewing angles have also been desired for antiglare films.

However, the present inventors investigated the techniques described below, based on the idea of liquid crystal televisions as new displays and considering changes in viewing environments, without considering narrowness of viewing angle and isotropy as drawbacks, but with emphasis on frontal image quality, in order to be free from the restriction of having to achieve trade-off between viewing angle and image quality.

Contrast and antiglare properties have hitherto been considered to depend on surface form, which includes the arithmetic mean roughness (Ra), ten-point height of irregularities (Rz) and average spacing of surface irregularities (Sm), based on JIS B-0601-1994 which deals with surface irregularities, and the mean inclination angle of irregularities (ea), based on the definition described in the instruction manual of the surface roughness measuring instrument SE-3400 by Kosaka Laboratory, Ltd. (Revision Jul. 20 1995)), or have been considered to depend on the state of reflection of external light that is based on the difference in refractive index between the interior dispersing agent and translucent resin, or the shapes of internal diffusion particles. In other words, the effect of interaction between surface irregularities and internal diffusion factors has not been considered.

The definition for calculating ea will now be explained.

In an irregular shape existing within a range of reference length L, heights are present at the highest parts from one raised section to the next raised section, and recesses are present at either end. The positions of the recesses are not necessarily at the same height.

The heights from each recess position to the triangular tip are designated as h1 and h2. Similarly, when the heights of all of the raised sections in the reference length range are measured from the recesses to the tips (each raised section having two heights), and the sum of the heights is determined, calculation of the arctangent of the value divided by the reference length L yields the angle.

$$\theta a = \tan^{-1}[(h1+h2+h3+h4+ \ldots +hn)/L]$$

The present inventors have found that the diffusion properties are significantly different for light passing through the diffusion particles and for reflected light, from projected light incident to the diffusion particles and external light, due to the difference in refractive indexes of the internal diffusion particles and translucent resin, as shown in FIGS. 8-1 to 8-4, and that a larger difference in refractive index between the diffusion particles and translucent resin increases the amount of light reflected by the diffusion particles and increases the diffusion angle of light passing through the diffusion particles, such that generation of stray light components due to projected light increases, the amount of light reflected from external light increases, and the contrast is lowered.

It was further found that, in regard to projected light as shown by 1-1 to 1-5 in FIG. 7-1, the transmission and reflectance properties of projected light passing through the diffusion particles, as well as generation of stray light components that impair resolution and contrast, differ significantly depending on the positional relationship between the diffusion particles and surface irregularities, and also that in regard to external light as well, as shown by 2-1 to 2-4 in FIG. 7-2, the generation of stray light components that impair the reflectance properties and contrast of light reflected by the diffusion particles, from external light incident to the diffusion layer interior, differs significantly depending on the positional relationship between the diffusion particles and surface irregularities, and by also considering the shapes of surface irregularities, the diffusion particle properties and the relationship between the surface irregularities and internal diffusion particles in an antiglare sheet for a liquid crystal display device according to the present application, it was possible to obtain an antiglare sheet for a liquid crystal display device having not only excellent contrast and antiglare properties for dynamic images, but also vivid complexion and blackness and image crispness.

Also, when the positional relationship between the surface irregularities and diffusion particles is such that the diffusion of external light reflected by the diffusion particles is large, as shown by the diffusion particle 2-2 in FIG. 7-2, the diffusion of projected light is also large tending to produce stray light components, as indicated by 1-2 in FIG. 7-1, thus also tending to result in contrast reduction due to the projected light.

That is, the magnitude relationship for contrast reduction by stray light components from projected light can be considered to approximate the reflectance properties for external light. The same applies for vivid complexion and blackness due to stray light components. Also, this stray light component generation is increased in the conventional methods that emphasize viewing angle, wherein LCD leaked light is widely diffused by providing wide-angle diffusion, even with low antiglare layer strength, and they have lacked a high level of blackness in dark rooms.

In other words, it is not possible to obtain an excellent antiglare film even by controlling the diffusion properties such as total haze or internal haze and external haze (also referred to as surface haze), or by controlling the surface form including the arithmetic mean roughness (Ra), ten-point height of irregularities (Rz), average spacing of surface irregularities (Sm) and mean inclination angle (θa), as in the prior art.

The present inventors have found that, in order to obtain dynamic images with excellent vivid complexion and blackness, it is satisfactory for the antiglare sheet for a liquid crystal display device to have low transmission diffusion, suitably high regular transmission intensity and high directivity of projected light from the interior, and to minimally reduce the stray light component of external light and projected light.

On the other hand, high transmission diffusion generates stray light components and lowers the directivity of internal projected light and causes images to appear discolored, such that vivid brilliance for display of flesh colors is not obtained.

To obtain still images with excellent image crispness, however, it is necessary to achieve both contrast and prevention of unwanted reflection. However, when the antiglare property is increased to improve prevention of unwanted reflection, the reflected scattering increases, contrast is reduced and image crispness is impaired.

As a result of much diligent research on image crispness, the present inventors have found that virtual images become a problem for an observer because the focus of the observer when viewing an image repeatedly meets at some images present on the exterior, that have been reflected on the outermost surface of the image display device (for example, the image of the observer or reflected images of objects in the background), and the focus fails to settle on the original image.

As a result of further research, it was found that if the borders of some reflected external image are rendered indistinct, the virtual image is no longer a problem and contrast reduction can also be minimized, while resulting in improved image crispness.

Also, since the antiglare property for dynamic images has the low resistance to unwanted reflection limited to that for dynamic image viewing, the antiglare property for dynamic images will be satisfactory so long as the image crispness is also satisfactory, and so long as the viewing is of dynamic images, it is sufficient to satisfy the antiglare property for dynamic images without satisfying image crispness.

In other words, in order to achieve both image crispness required for still images and vivid complexion and blackness for dynamic images, it was found that it is important to minimize the reduction in the regular transmission intensity component of transmission scattering, and appropriately ensure low reflected scattering that renders the borders of reflected external images indistinct, while also reducing the stray light component.

This means that the regular reflection intensity component is converted to diffusion near the regular reflection, and considering (a) to (c) below, it means that an antiglare sheet for a liquid crystal display device can be obtained that exhibits both still image crispness and dynamic image vivid complexion and blackness.

That is, it satisfies the three factors of: (a) low transmission scattering (high regular transmission intensity component), (b) a small regular reflection intensity component, and (c) conversion to diffusion near the regular reflection.

An antiglare sheet usually includes added conductive particles to impart an antistatic function or added fine particles to prevent glare or form surface irregularities, and it has internal diffusion other than the diffusion by the surface irregularities (hereunder referred to as "external diffusion").

FIG. 1 shows the results of a simulation of surface reflectance of a resin coating film with a refractive index of 1.50, and reflectance on the surfaces of spherical dispersing agent particles dispersed in the resin coating film, with varying particle refractive indexes. As shown in FIG. 1, the reflection intensity by internal diffusion factors is significantly smaller than the reflection intensity by external diffusion, and therefore surface diffusion is the dominant factor of the diffuse reflection intensity.

Also, diffusion of transmitted light by the surface form is n P sin θ=sin φ based on Snell's law, where φ is the emergence angle from the slanted surface at θ and n is the refractive index of the coating film, and the emergence angle ψ is arcsin(n P sin θ)−θ.

Reflection, on the other hand, undergoes twice the change in the slanted surface at θ, based on the law of reflection, and therefore the angle of reflection φ is 2 P θ. Thus, within the ordinary range for coating film refractive indexes and antiglare sheet surface forms, the diffusion angles of reflection and transmission with respect to the surface inclination angle may be considered to be proportional, as shown in FIG. 2 which has the results of calculation for a resin surface with a refractive index of 1.50.

That is, since low regular reflection intensity is low regular transmission intensity, and increasing the diffusion near regular reflection increases the diffusion near regular transmission, all three factors demanded for an antiglare sheet for a liquid crystal display device with both prevention of unwanted reflection for still images and vivid complexion and blackness for dynamic images as described above, can be converted to transmission. Also, as explained above, they can still be converted while satisfying the antiglare property for dynamic images.

That is, factors (a) to (c) can be restated as: (a) low transmission scattering (high regular transmission intensity), (b') a low regular transmission intensity component, and (c') conversion to diffusion near regular transmission.

Factors (b') and (c') represent a small ratio Q/q between the regular transmission intensity (Q) and diffusion intensity near regular transmission (q), while (a) represents a large Q/q.

Incidentally, since the haze value hitherto used in antiglare sheets for liquid crystal display devices is the ratio of light that has been diffused at least 2.5 degrees from regular transmission with respect to the total light rays, as indicated by JIS K7136, it is not possible, simply based on the haze value, to imagine using the aforementioned diffusion near regular transmission (especially diffusion of less than 2.5 degrees).

However, since it is impossible to prevent glare with an antiglare sheet for a liquid crystal display device with absolutely no internal diffusion, it is necessary for at least a small degree of internal diffusion to be present. The diffusion size by internal diffusion may be diffusion not exceeding 2.5 degrees, in which case the haze due to internal diffusion is zero.

The diffusion intensity near regular transmission in the case of isotropic diffusion was therefore considered.

As shown schematically in FIG. 3, in regard to the diffusion intensity, when a layer with diffuse transmission intensity distribution b is laminated on a transparent base with diffuse transmission intensity distribution a, the reduction rate of the diffuse transmission intensity is larger closer to 0 degrees, and therefore the reduction is greater with intensity closer to 0 degrees, and the antiglare sheet for a liquid crystal display device has a diffuse transmission intensity distribution of c.

Also, since the internal diffusion factor and external diffusion factor in an antiglare sheet for a liquid crystal display device generally both have sparse distribution, the intensity distribution of the diffusion property is the sum of the diffusion intensity distribution due to the diffusion factors, and the two intensity distributions having only the intensity for regular transmission without the diffusion factors.

As shown in FIG. 4, if the virtual regular transmission intensity U is defined as the intensity for the slopes of the intensity at regular transmission±1 degree and regular transmission±2 degree, that have been extrapolated from regular transmission, then U approximates the regular transmission intensity of the diffusion property due to diffusion factors, and Q/U is the ratio of "the portion Q with no diffusion factor" and "the regular transmission intensity U of the diffusion factor portion", or in other words, the ratio of "the intensity Q of regular transmission without transmission scattering" and "the regular transmission intensity U guided in the direction of 0 degrees by transmission scattering", i.e. it is a measure of the state of diffusion near regular transmission.

FIG. 3 and FIG. 4 also show that U is larger with greater intensity near regular transmission, and that the change in U with respect to Q is smaller with a greater initial diffusion angle.

Stated differently, using U instead of the intensity q near regular transmission is a form of also incorporating the size of the (a) transmission scattering.

Thus, by limiting the range of Q/U to a specified range, it is possible to achieve a satisfactory balance between image crispness and dynamic image vivid complexion and blackness, to obtain an antiglare sheet for a liquid crystal display device having both of these aspects of performance.

In other words, since in terms of the surface form (external diffusion factor), Q/U is approximately the ratio between the flat section which provides regular transmission and the concavoconvex section which is the non-regular transmission angle, it is related to the irregularity slope angles and the percentage of irregularities, while in terms of internal diffusion it is related to the difference in refractive indexes of the diffusion particles and the translucent resin and the probability of collision of diffusion particles and the shape, and in terms of interaction between the surface form and internal diffusion, it is related to how much further the interaction is weakened or strengthened, so that it determines the vivid complexion and blackness and quality of sharpness.

In order to realize a high level of blackness in dark surroundings, however, it is desirable to further prevent stray light, and therefore stray light is further considered.

Generally speaking, at the interface between a layer with refractive index n and air, the proportion of reflection at the interface when light from the layer interior impinges on the interface at angle θ is represented by the following formula, based on calculation according to the law of reflection and Snell's law, where p polarized light is represented as Rp and s polarized light is represented as Rs.

$$Rp = ((\cos\theta - n P \cos(\arcsin(n P \sin\theta)))/(\cos\theta + n P \cos(\arcsin(n P \sin\theta))))^2$$

$$Rs = ((\cos(\arcsin(n P \sin\theta)) - n P \cos\theta)/(\cos(\arcsin(n P \sin\theta)) + n P \cos\theta))^2$$

Also, the transmitted scattering angle φ with low internal diffusion in an antiglare layer with surface irregularities is calculated based on Snell's law:

$$\phi = \arcsin(n_B P \sin\theta s) - \theta s$$

where θs is the inclination angle of surface irregularities and $n_B$ is the refractive index of the translucent resin.

Thus, when projected light impinging on an antiglare layer from the transparent base material side impinges on an irregular surface with inclination angle θs (the interface between the antiglare layer and air), the relationships θ=θs, n=$n_B$ may be assumed for the above formula, and therefore the proportion of reflection on the irregular surface is represented by Rp and Rs, which can be represented as functions of the transmitted scattering angle φ. Also, larger Rp and Rs values correspond to increased stray light components since more light is reflected at the irregular surface and returns into the antiglare layer.

FIG. 6 shows values calculated by the above formula, using a refractive index of 1.50 for a common translucent resin. Since the surface irregularities on the antiglare layer are randomly formed, the average reflection proportion can be represented as (Rp+Rs)/2. As clearly seen in FIG. 6, a transmitted scattering angle exceeding 30 degrees results in drastically increased reflection, i.e. drastically increased stray light components.

Thus, transmission scattering at 30 degrees or greater is preferably absent in order to avoid generating stray light components, and since reflection begins to increase from 20 degrees, limiting the transmission scattering to no greater than 20 degrees can reliably prevent generation of stray light components.

In order to realize such optical properties, a solution was found based on the following understanding of the mechanism of irregularity formation on the antiglare layer surface by diffusion particles.

Specifically, the volume of a translucent resin shrinks when it is cured. The diffusion particles, on the other hand, do not shrink, such that resistance by the diffusion particles to shrinkage of the translucent resin results in raised sections on the surface at locations corresponding to the diffusion particles and thus formation of irregularities, and therefore if the diffusion particles are soft, the resistance against cure shrinkage by the translucent resin is reduced and the inclination angles of the surface irregularities are attenuated.

However, because soft diffusion particles are particles with low polymerization degrees and low crosslink density, they tend to swell in the antiglare layer coating solution and undergo changes in viscosity, or gelling, such that the coating stability is lost and a level for practical use cannot be achieved.

Thus, it is a feature of the present invention that the ratio Q/U is the target of focus, but the problem at issue can also be reliably solved by further targeting $\mathrm{Log}_{10}(Q_{30}/Q)$, and in order to obtain a more excellent effect, it is also possible to achieve the object of the invention by combining other parameters, i.e. the other optional parameters specified in the claims of the invention.

The present invention compensates for the deficiency created by softness of the diffusion particles, and the invention has been accomplished upon finding that diffusion particles having coating stability and resistance to translucent resin shrinkage in suitable ranges are satisfactory if the impregnation layer is on 5% to 40% of the radius of the diffusion particles, on the diffusion particle surfaces.

Since the refractive index of the impregnation layer is closer to the refractive index of the translucent resin than the refractive index of the diffusion particles, impregnation to 40% or greater reduces the internal diffusion exhibited by the difference between the refractive indexes of the translucent resin and the diffusion particles, even if the effect described above is obtained, and this can risk impairing the black tightness and especially the glare prevention property.

The present invention has been completed based on the knowledge described above, and it encompasses the following modes.

(1) An antiglare sheet having an antiglare layer comprising a translucent resin and diffusion particles on at least one side of a transparent base material, the antiglare layer having irregularities on the side opposite the transparent base material, the irregularities being formed primarily by raised sections based on the diffusion particles that have an impregnation layer in which all or a portion of the component composing the translucent resin has been impregnated, wherein the following inequalities (1) and (2) are satisfied, Q representing the luminance in the direction of regular transmission, when visible light rays have been irradiated on the antiglare sheet perpendicular to the transparent base material side, $Q_{30}$ representing the luminance in the direction 30 degrees from regular transmission, and U representing the mean value of the transmission intensity determined by extrapolation of a straight line connecting the luminance in the direction +2 degrees from regular transmission with the luminance in the direction +1 degrees from regular transmission, and a straight line connecting the luminance in the direction −2 degrees from regular transmission with the luminance in the direction −1 degrees from regular transmission, to regular transmission.

$$10 < Q/U < 36 \tag{Inequality 1}$$

$$\mathrm{Log}_{10}(Q_{30}/Q) < -6 \tag{Inequality 2}$$

(2) An antiglare sheet satisfying the following (inequality 3) and (inequality 4), where T is the thickness of the antiglare layer, R is the radius of the translucent particles in the antiglare layer, and P is the thickness of the impregnation layer.

$$0.25 < R/T < 0.45 \tag{Inequality 3}$$

$$5\% < P/R < 40\% \tag{Inequality 4}$$

(3) An antiglare sheet satisfying the following (inequality 5), where $Q_{20}$ is the luminance in a direction 20 degrees from regular transmission, when visible light rays are irradiated perpendicular to the antiglare sheet from the transparent base material.

$$\mathrm{Log}_{10}(Q_{20}/Q) < -5.5 \tag{Inequality 5}$$

(4) An antiglare sheet satisfying the following (inequality 6), where Hi (%) is the internal haze value of the antiglare sheet and Ha (%) is the total haze value of the antiglare sheet.

$$0 \leq Ha - Hi \leq 4 \tag{Inequality 6}$$

(5) An antiglare sheet satisfying the following (inequality 7), where D is the ratio of the value with a 2.0 mm optical comb with respect to the value with a 0.125 mm optical comb, as the transmitted image clarity of the antiglare sheet based on JIS K7105.

$$D < 2 \tag{Inequality 7}$$

(6) An antiglare sheet having a low refractive index layer formed on the uppermost surface layer.

(7) A polarizing plate employing the aforementioned antiglare sheet.

(8) An image display device employing the aforementioned antiglare sheet or the aforementioned polarizing plate.

(9) A method for producing an antiglare sheet having an antiglare layer comprising a translucent resin and diffusion particles on at least one side of a transparent base material, the antiglare layer having irregularities on the side opposite the transparent base material, the irregularities being formed primarily by raised sections based on the diffusion particles that have an impregnation layer in which all or a portion of the component composing the translucent resin has been impregnated, wherein control is effected so that the antiglare sheet properties satisfy the following (inequality 1) and (inequality 2), Q representing the luminance in the direction of regular transmission, when visible light rays have been irradiated on the antiglare sheet perpendicular to the transparent base material side, $Q_{30}$ representing the luminance in the direction 30 degrees from regular transmission, and U representing the mean value of the transmission intensity determined by extrapolation of a straight line connecting the luminance in the direction +2 degrees from regular transmission with the luminance in the direction +1 degrees from regular transmission, and a straight line connecting the luminance in the direction −2 degrees from regular transmission with the luminance in the direction −1 degrees from regular transmission, to regular transmission.

$$10 < Q/U < 36 \tag{Inequality 1}$$

$$\mathrm{Log}_n(Q_{30}/Q) < -6 \tag{Inequality 2}$$

Advantageous Effects of Invention

According to the invention it is possible to provide an antiglare sheet for an image display device having a high level of blackness and excellent vivid complexion and blackness and black glaze in dark surroundings, and an antiglare property tolerable for dynamic image purposes (an antiglare property for dynamic images), as well as suitability for practical use, and a method for producing it.

It is also possible to provide a method for improving vivid complexion and blackness and image crispness of an image display device suited for both dynamic images and still images, by using the antiglare sheet.

BRIEF DESCRIPTION OF DRAWINGS

FIG. 7-1 is a diagram illustrating the properties of transmitted light and reflected light based on the positional relationship of diffusion particles and surface irregularities for projected light and external light.

FIG. 7-2 is a diagram illustrating the properties of transmitted light and reflected light based on the positional relationship of diffusion particles and surface irregularities for projected light and external light.

FIG. 8-1 is a set of diagrams illustrating differences in diffusion properties of light based on the difference in refractive indexes of internal diffusion particles and translucent resin.

FIG. 8-2 is a set of diagrams illustrating differences in diffusion properties of light based on the difference in refractive indexes of internal diffusion particles and translucent resin.

FIG. 8-3 is a set of diagrams illustrating differences in diffusion properties of light based on the difference in refractive indexes of internal diffusion particles and a translucent resin.

FIG. 8-4 is a set of diagrams illustrating differences in diffusion properties of light based on the difference in refractive indexes of internal diffusion particles and translucent resin.

DESCRIPTION OF EMBODIMENTS

The antiglare sheet of the invention is an antiglare sheet having an antiglare layer comprising a translucent resin and diffusion particles on at least one side of a transparent base material, the antiglare layer having irregularities on the side opposite the transparent base material, the irregularities being formed primarily by raised sections based on the diffusion particles that have an impregnation layer in which all or a portion of the component composing the translucent resin has been impregnated, wherein the following (inequality 1) and (inequality 2) are satisfied, Q representing the luminance in the direction of regular transmission, when visible light rays have been irradiated on the antiglare sheet perpendicular to the transparent base material side, $Q_{30}$ representing the luminance in the direction 30 degrees from regular transmission, and U representing the mean value of the transmission intensity determined by extrapolation of a straight line connecting the luminance in the direction +2 degrees from regular transmission with the luminance in the direction +1 degrees from regular transmission, and a straight line connecting the luminance in the direction −2 degrees from regular transmission with the luminance in the direction −1 degrees from regular transmission, to regular transmission.

$$10 < Q/U < 36 \quad \text{(Inequality 1)}$$

$$\text{Log}_{10}(Q_{30}/Q) < -6 \quad \text{(Inequality 2)}$$

Figure 5:
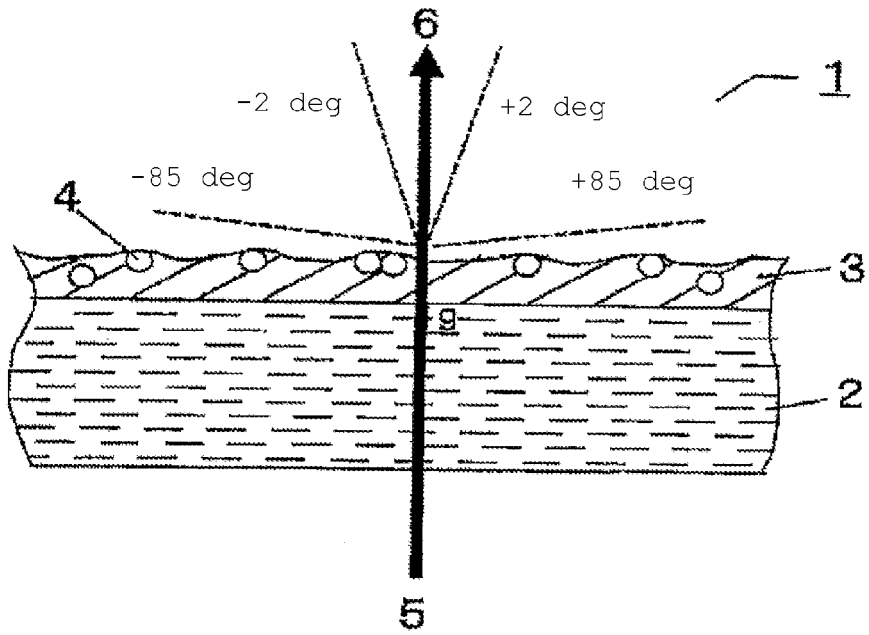
FIG. 5 is a conceptual drawing showing the method of measuring diffuse transmission intensity according to the invention.
Figure 6:
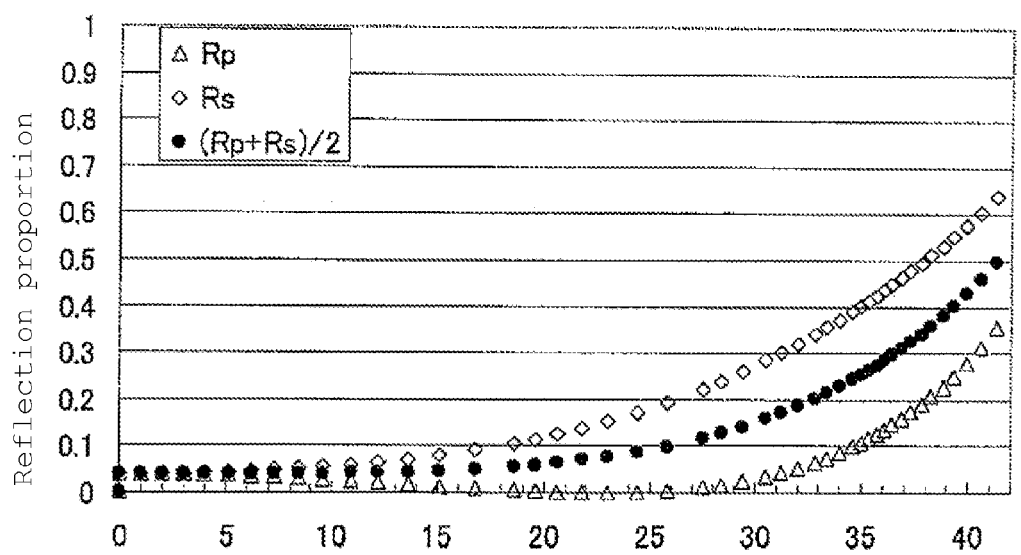
FIG. 6 is a diagram showing the relationship between transmitted scattering angle and reflection proportion on the irregular surface, according to the invention.
Figures 1, 7:
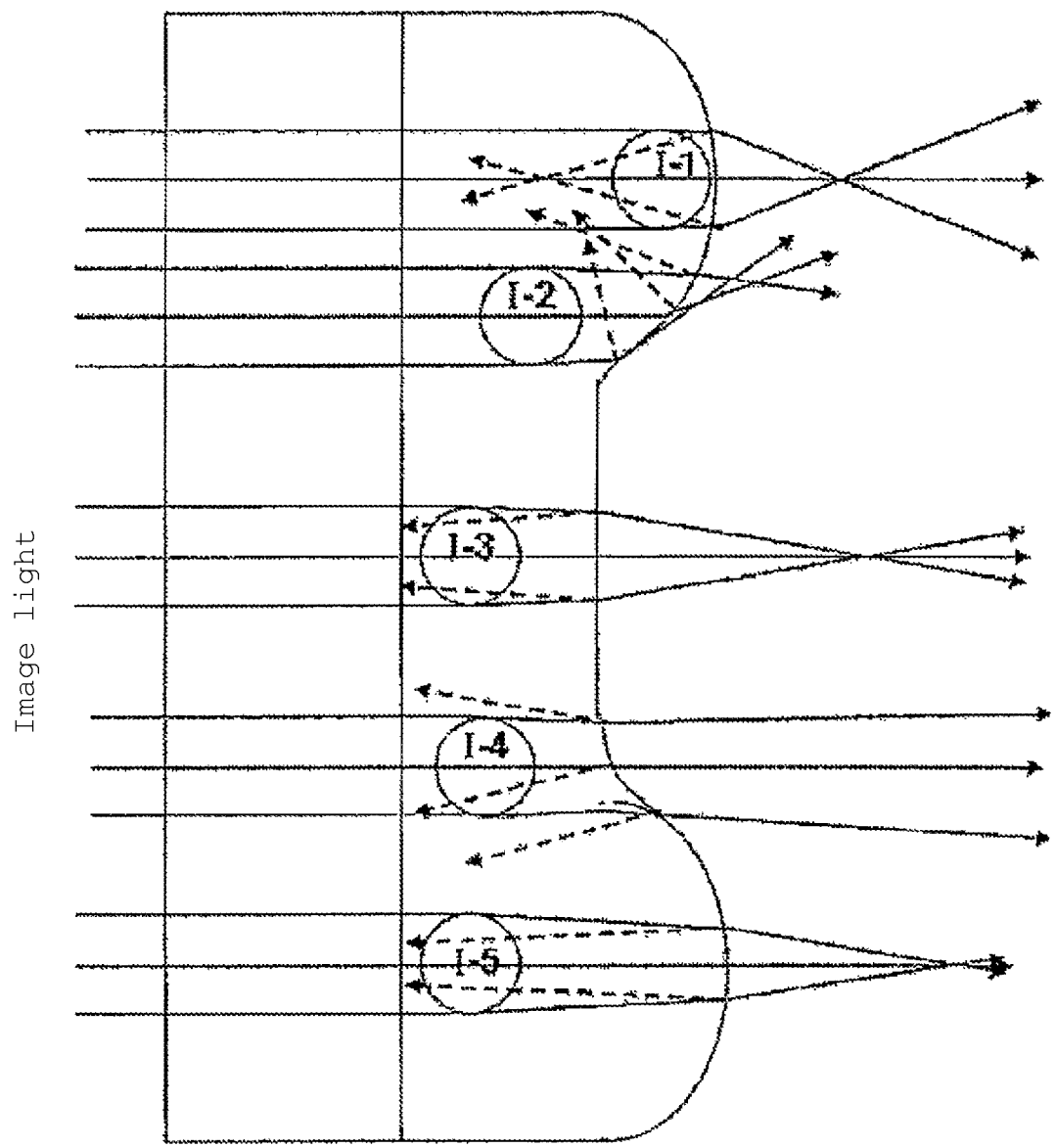
Figures 2, 7:
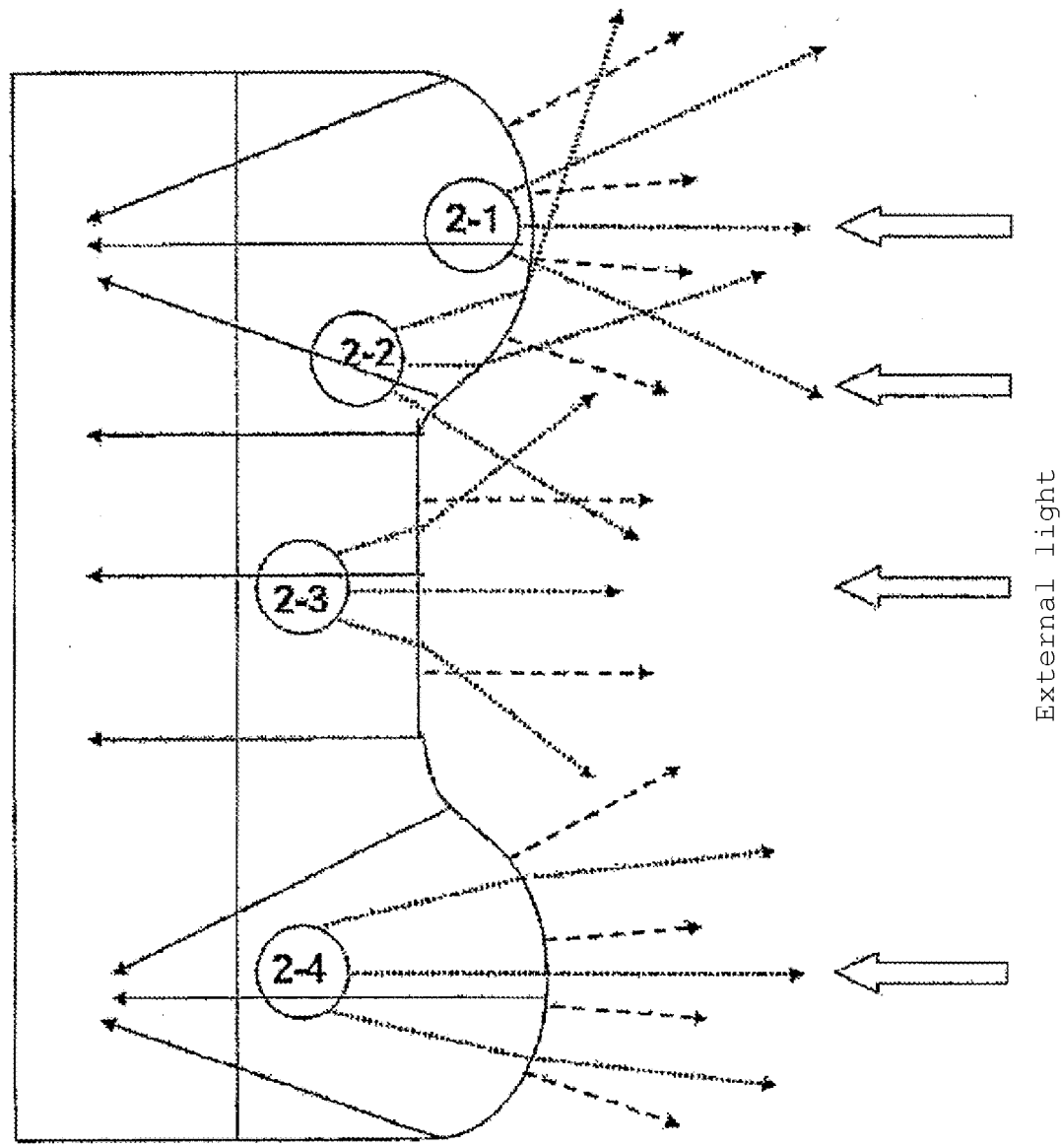
Figures 1, 8:
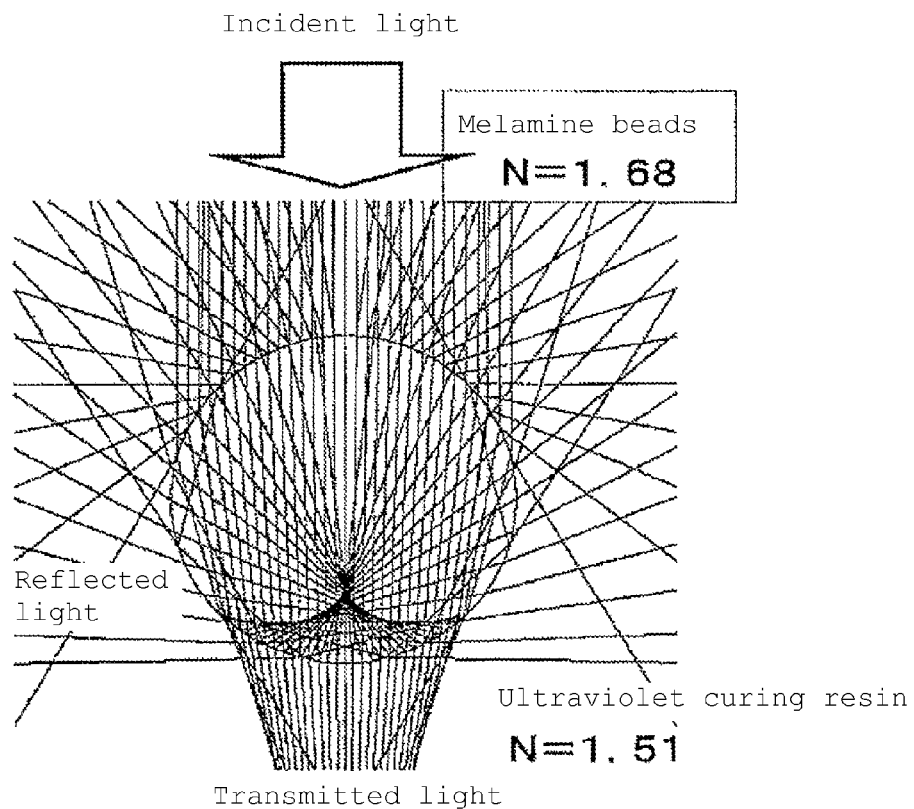
Figures 2, 8:
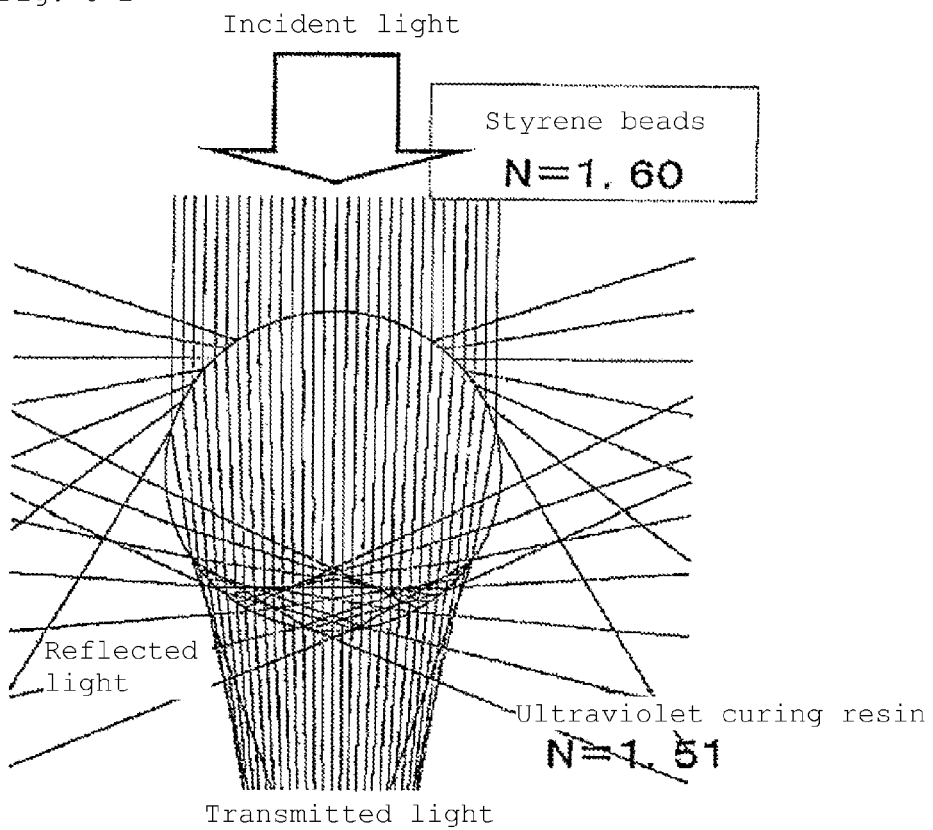
Figures 3, 8:
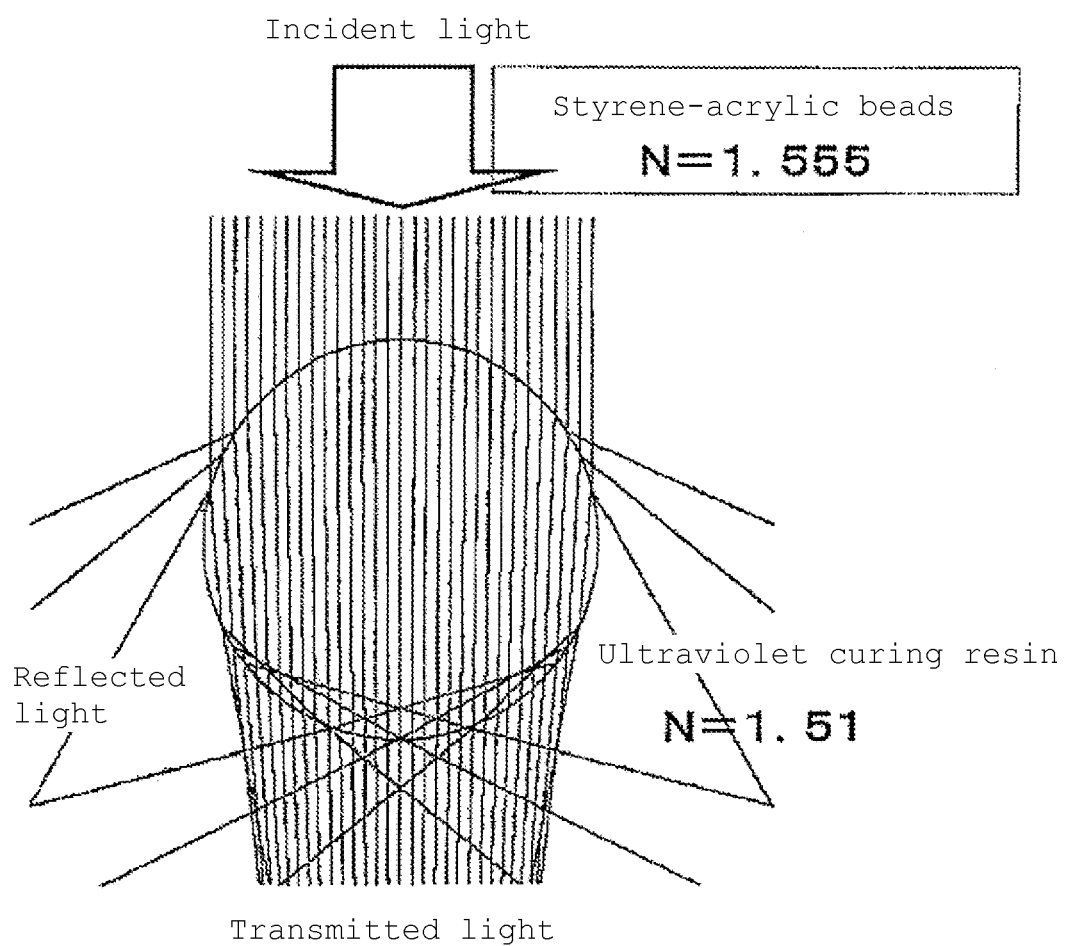
Figures 4, 8:
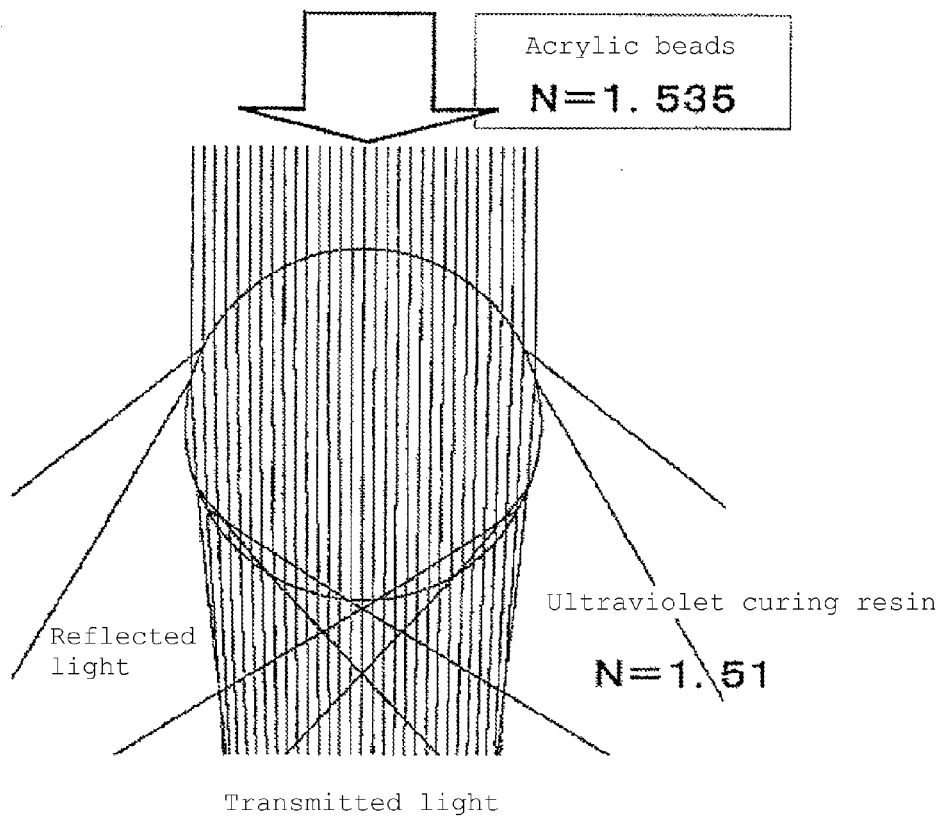
Figure 9:
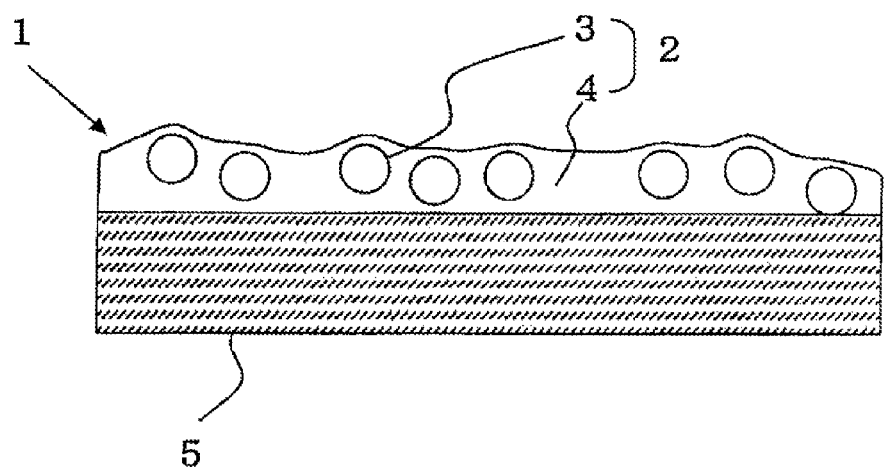
FIG. 9 is a cross-sectional view showing an embodiment of an antiglare sheet of the invention. This antiglare sheet 1 has an antiglare layer 2 provided on a transparent base material 5, and the antiglare layer 2 comprises a transparent resin 4 and diffusion particles 3.
Figure 10:
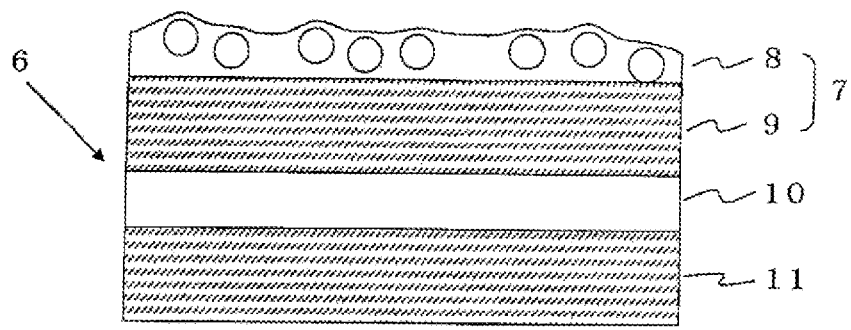
FIG. 10 is a cross-sectional view showing an embodiment of a polarizing plate using an antiglare sheet of the invention. This polarizing plate 6 has an antiglare sheet 7 of the invention, a polarized light layer 10, and a transparent base material 11 in this order, and the antiglare sheet 7 has an antiglare layer 8 provided on a transparent base material 9.
Figure 11:
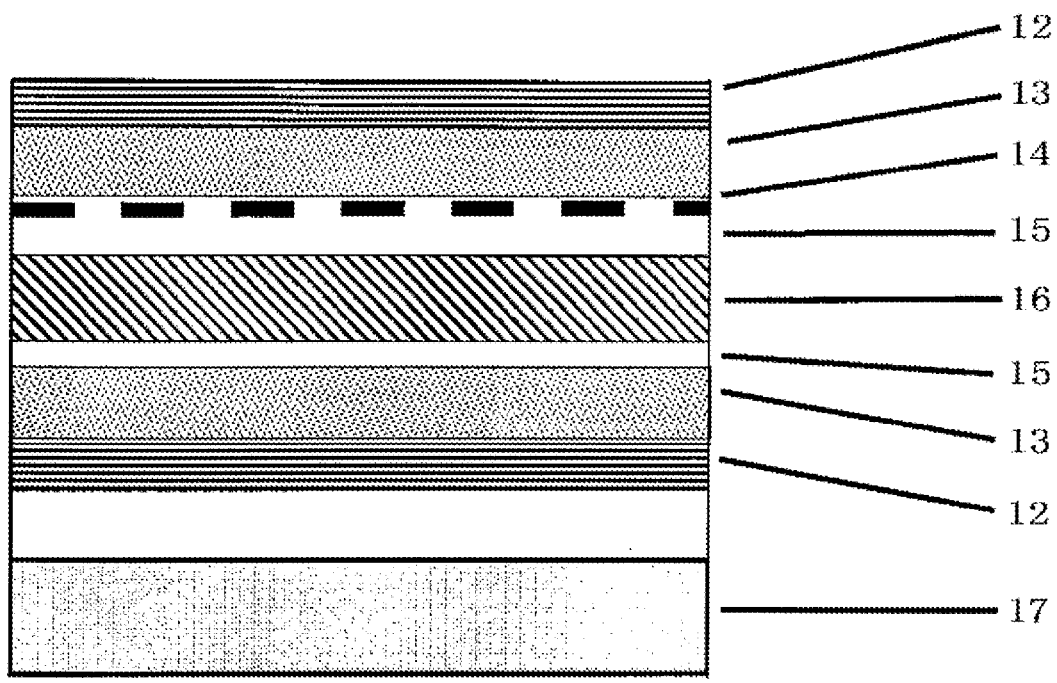
FIG. 11 is a cross-sectional view showing an embodiment of a liquid crystal display device using a polarizing plate of the invention. This liquid crystal display device has a first polarizing plate 12, a first glass panel 13, a color filter 14, a first transparent electrode 15, a liquid crystal cell 16, a second transparent electrode 15, a second glass panel 13, a second polarizing plate 12, and a backlight 17, in this order. The first and second polarizing plates 12 use an antiglare sheet of the invention.

The method of measuring Q and $Q_{30}$ will now be explained with reference to FIG. 5. When visible light rays are irradiated from direction 5 onto the antiglare sheet for a liquid crystal display device shown in FIG. 5, regular transmission occurs in direction 6, while part of the light is diffused. The transmission intensity in direction 6, i.e. at 0 degrees, is the regular transmission intensity Q. Also, the transmission intensity in the direction of 30 degrees is regular transmission intensity $Q_{30}$.

Figure 1:
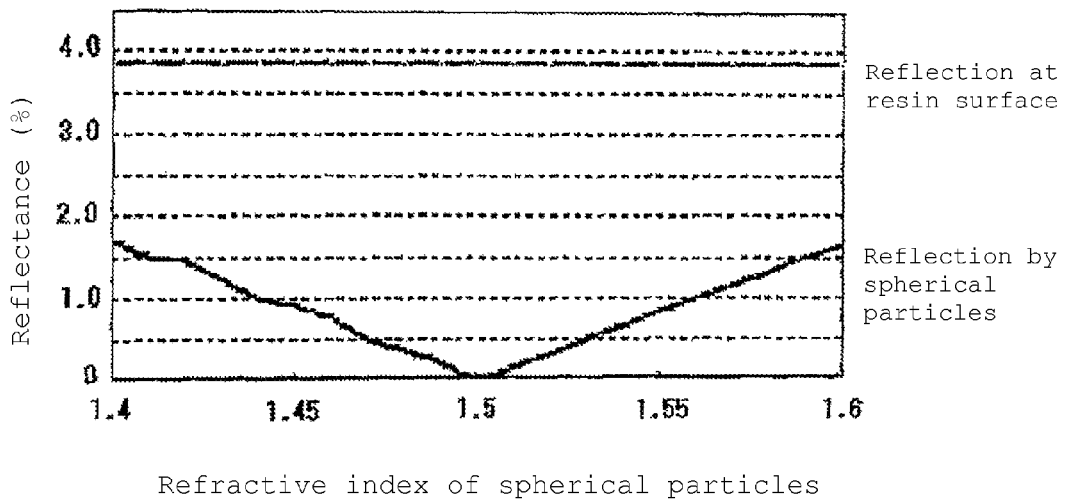
FIG. 1 is a graph showing reflectance by spherical particles and a resin.
Figure 2:
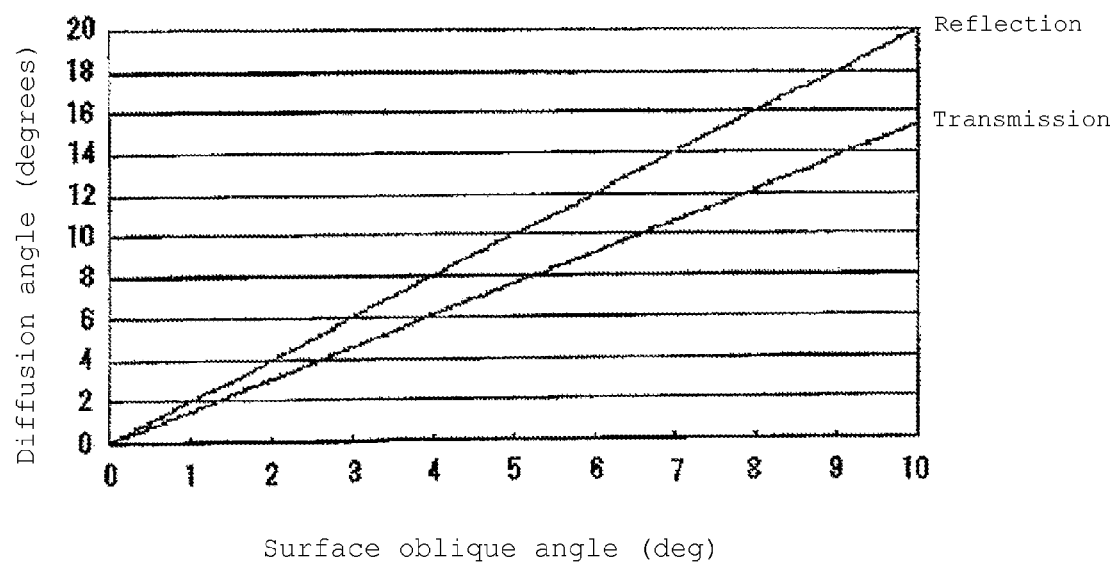
FIG. 2 is a graph showing the angles of reflection and transmission with respect to surface inclination angle.
Figure 3:
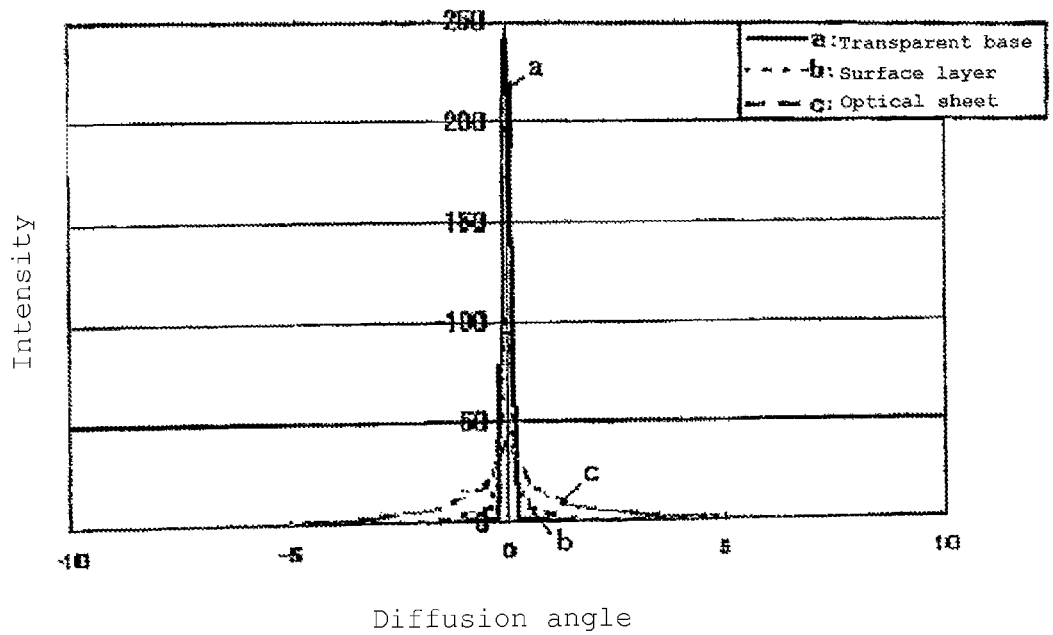
FIG. 3 is a graph showing diffusion intensity distribution.
Figure 4:
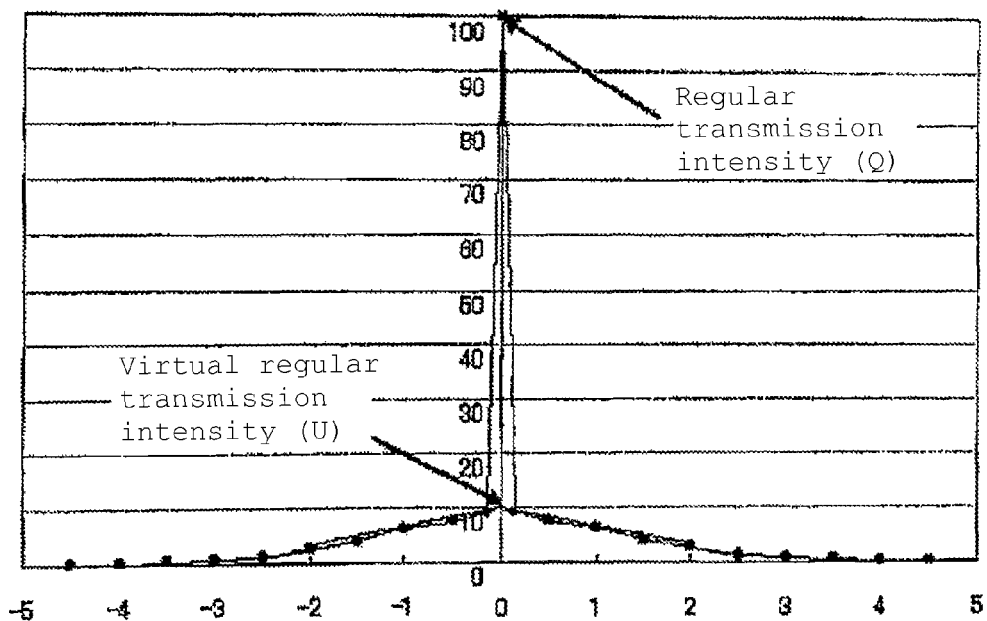
FIG. 4 is a conceptual drawing illustrating the principle of the evaluation method of the invention.

The transmission intensities at regular transmission±2 degrees and regular transmission±1 degree are measured, the intensities are connected with a straight line, and the average of the transmission intensity extrapolated at regular transmission (0 degrees) is defined as the virtual regular transmission intensity U (see FIG. 4).

In addition, by controlling the material selection and production conditions in the antiglare sheet production process, using Q/U as the index, it is possible to accomplish efficient production of an antiglare sheet with excellent vivid complexion and blackness and antiglare properties suitable for dynamic images (antiglare properties for dynamic images), as well as excellent image crispness.

Specifically, the diffuse transmission intensity is measured in the following manner.

(Method of Measuring Diffuse Transmission Intensity)

Visible light rays are irradiated perpendicular to the back side of the antiglare sheet (the side of the antiglare sheet opposite the observer side). A light beam is directed onto the antiglare sheet and the diffuse transmission intensity of the diffuse transmitted light is measured by scanning with a photodetector one degree at a time in a range of −85 to +85 degrees.

The apparatus used to measure the diffuse transmission intensity is not particularly restricted, but a "GC5000 L" by Nippon Denshoku Industries Co., Ltd. was used for the invention. The measurement was carried out in the range of −85 to +85 degrees, but since calculation of the virtual regular transmission intensity and measurement of the regular transmission intensity can be conveniently accomplished by measurement only at −1, −2, 0, +1 and +2 degrees, automatic adjustment within the indicated range can be easily made while varying the production conditions online.

Here, the diameter of the "GC5000L" light beam was approximately 3 mm, the diameter being the average light beam diameter of a commonly used goniophotometer.

Also, since the particle sizes of the translucent particles used for the invention are on the micron order while the light beam diameter is approximately 1000 times larger than the diameters of the particles that are the internal diffusion factors, or in other words, since with ordinary goniophotometer measurement the light beam diameter is sufficiently larger than the particle sizes and the particles are also uniformly dispersed, no significant difference in measured value is found even when the light beam is irradiated at points on a sample, and precise measurement can be accomplished.

The values of $Q_{30}$, and $Q_{20}$ which is the transmission intensity in the direction 20 degrees from regular transmission, $Q_{20}$ being the average value for 20 degrees and −20 degrees and $Q_{30}$ being the average value for 30 degrees and −30 degrees, are measured by the measuring method described above.

It is a feature of the invention that control is effected using the following inequality (X) as the index.

$$\text{Log}_{10}(Q_{30}/Q) < -6 \qquad (x)$$

By limiting $\text{Log}_{10}(Q_{30}/Q)$ to less than −6, it is possible to obtain an antiglare sheet for a liquid crystal display device having excellent vivid complexion and blackness and dark room blackness.

Also, by satisfying the following inequality (y), it is possible to obtain an antiglare sheet for a liquid crystal display device having an even more excellent high level of blackness in dark rooms.

$$\text{Log}_{10}(Q_{20}/Q) < -5.5 \qquad (y)$$

When $Q_{30}$ or $Q_{20}$ is extremely small so as to be undetectable by the measuring instrument, the value of $\text{Log}_{10}(Q_{30}/Q)$ or $\text{Log}_{10}(Q_{20}/Q)$ is assumed to be −10.0.

It is another feature of the invention that control is effected using the following inequality (z) as the index.

$$10 < Q/U < 36 \qquad (z)$$

If Q/U is greater than 10 the vivid complexion and blackness will be excellent, and if it is less than 36, it will be possible to obtain an antiglare sheet for a liquid crystal display device with an excellent antiglare property for dynamic images.

In addition, Q/U is even more preferably greater than 11.5 and less than 34, since the vivid complexion and blackness and the antiglare property for dynamic images will be further improved.

The antiglare sheet for a liquid crystal display device of the invention satisfies inequalities formula (x) and (z) above. An antiglare sheet for a liquid crystal display device satisfying inequalities (x) and (z) above has an excellent high level of blackness in dark surroundings and excellent vivid complexion and blackness and black glaze, and therefore serves as an antiglare sheet for a liquid crystal display device having an antiglare property that is tolerable for dynamic images (antiglare property for dynamic images).

For the antiglare sheet of the invention, the antiglare layer is obtained by coating at least one side of the transparent base material with a coating solution containing organic fine particles as diffusion particles, and a radiation curable translucent resin containing a (meth)acrylate monomer, as a translucent resin capable of impregnating the organic fine particles, and preferably also a solvent that swells the organic fine particles, and more preferably a coating solution capable of impregnating the transparent base material as well, and yet more preferably a coating solution containing a solvent that swells the transparent base material, drying it to form a film, and curing the coating film.

The organic fine particles as the diffusion particles have an impregnation layer impregnated with the radiation curable translucent resin, as a translucent resin. In the following explanation, the organic fine particles on which the impregnation layer is to be formed will be referred to as "organic fine particles (A1)", and the organic fine particles on which the impregnation layer has been formed, i.e. the organic fine particles in the diffusion layer, will be referred to as "organic fine particles (A2)".

By having such an impregnation layer, the organic fine particles (A2) have very excellent adhesiveness with the cured radiation curable translucent resin of the diffusion layer (also hereunder referred to as "translucent resin"). In addition, since the impregnation layer on the organic fine particles (A2) is formed as a mixture of the radiation curable translucent resin and the material composing the organic fine particles (A2), it is possible to satisfactorily prevent reflection of diffusion layer-transmitted light at the interface between the organic fine particles (A2) (impregnation layer) and the translucent resin.

Furthermore, because the impregnation layer is a layer satisfactorily formed by swelling the organic fine particles (A1) with the radiation curable translucent resin and/or solvent, as the translucent resin, the organic fine particles (A2) are extremely soft fine particles. Consequently, while raised sections are formed at locations of the surface of the diffusion layer corresponding to the organic fine particles (A2) in the diffusion layer, gentle shapes can result for the raised sections. This will be explained in detail below.

Furthermore, with a coating solution capable of impregnating the transparent base material, and/or a coating solution further containing a swelling solvent, since the transparent base material exhibits softness during curing, the depressions at the sections in contact with the organic fine particles undergo deformation, such that it is possible to obtain even more gentle raised sections on the surface of the diffusion layer.

The material composing the organic fine particles (A1) is preferably a radiation curable translucent resin and/or a resin that swells with solvents, and specifically, it may be a polyester resin, styrene resin, acrylic resin, olefin resin or their copolymer, for example, among which crosslinked acrylic resins and crosslinked acryl-styrene copolymer resins are preferably used. As used herein, "resin" is a concept also encompassing resin components such as monomers and oligomers.

Organic fine particles made of acrylic resins, styrene resins and acryl-styrene copolymers, when produced by commonly known production methods, all often use acryl-styrene copolymer resins as the materials.

Also, when the organic fine particles (A1) are core-shell type fine particles, polystyrene fine particles employing fine particles made of an acrylic resin as the core, or conversely, polyacryl fine particles employing fine particles made of a styrene resin in the core, are present.

Throughout the present specification, therefore, the distinction between acrylic fine particles, styrene fine particles and acryl-styrene copolymerization fine particles will be made according to which type of resin the properties of the fine particles (such as refractive index) are most similar. For example, if the refractive index of the fine particles is less than 1.50 they are considered acrylic fine particles, if the refractive index of the fine particles is at least 1.50 and less than 1.59 they are considered acryl-styrene copolymer fine particles, and if the refractive index of the fine particles is 1.59 or greater they are considered styrene fine particles.

Examples of crosslinked acrylic resins include homopolymers or copolymers obtained by polymerization of acrylic monomers such as acrylic acid and acrylic acid esters, methacrylic acid and methacrylic acid esters, acrylamides, acrylonitriles and the like, using polymerization initiators such as persulfuric acid and crosslinking agents such as ethylene glycol dimethacrylate, by methods such as suspension polymerization.

Particularly suitable are crosslinked acrylic resins obtained using methyl methacrylate as the acrylic monomer.

The thickness of the impregnation layer can be controlled by adjusting the degree of swelling by the radiation curable translucent resin and/or the solvent, described hereunder, and it is preferred for this purpose to vary the degree of crosslinking so that the amount of impregnation in the radiation curable translucent resin is in the preferred range.

The mean particle size of the organic fine particles (A1) is preferably in the range of 0.5 to 10.0 μm, for example. A more preferred range is 1.0 to 8.0 μm. If the particle size is smaller than 0.5 μm the antiglare property for dynamic images of the antiglare film of the invention may be insufficient, and if it exceeds 10.0 μm, the particles will be too large with respect to the coating film, potentially making it impossible to form smooth surface irregularities.

Also, the following inequality is preferred satisfied:

$$0.25<R/T<0.45$$

for the thickness T of the antiglare layer and R as the radius of the particles, which is half of the mean particle size of the organic fine particles. If the value is greater than 0.25 it will be possible to obtain a suitable antiglare property for dynamic images and if it is less than 0.45 it will be possible to avoid protrusion of the translucent particles on the outermost surface of the coating film layer so that the irregularities will not be too steep but rather smooth and more gently embedded, thus ensuring that suitable contrast is obtained.

The mean particle size is the particle size of the particles most abundantly present, as determined by particle size distribution measurement of each of the particles in the diffusion layer. The particle size can be measured as primarily the weight diameter (volume diameter), by the Coulter counter method. Alternatives to this method include measurement by laser diffraction, electron microscope observation and optical microscope observation.

Lower variation in the particle size of the translucent particles will also result in lower variation in the diffusion property, thus facilitating design of the diffuse transmission intensity distribution. More specifically, (d75-d25)/MV is preferably no greater than 0.25 and more preferably no greater than 0.20, where MV is the mean diameter based on the weight average, d25 is the cumulative 25% diameter and d75 is the cumulative 75% diameter.

The cumulative 25% diameter is the particle size constituting 25 wt %, counting from the particles with small particle size among the particle size distribution, and the cumulative 75% diameter is the particle size constituting 75 wt %, counting in the same manner.

As an example of adjusting the variation in particle size, the synthesis reaction conditions may be modified, while classification after synthesis reaction is also an effective means. With classification, the frequency may be increased or the degree intensified to obtain particles with the preferred distribution. The method used for classification is preferably an air classification method, centrifugal classification method, precipitating classification method, filtering classification method, electrostatic classification method or the like. When the translucent particles are organic fine particles, the particle sizes may differ from the original particles if they are organic fine particles having an impregnation layer in which the components in the coating solution are impregnated into the organic fine particles, but the aforementioned "particle size" refers to the sizes of the particles in the layer with the diffusion factor.

The organic fine particles (A2) in the diffusion layer have an impregnation layer.

The impregnation layer is a layer formed by impregnating the radiation curable translucent resin from the outer surface toward the center of the organic fine particles (A2) in the diffusion layer. The impregnation layer is a layer formed by impregnation of the low-molecular-weight components in the radiation curable translucent resin, i.e. mainly monomers, whereas the polymers (macromolecular components) in the radiation curable translucent resin, i.e. the polymers and oligomers, are resistant to impregnation. Preferred are monomers with weight-average molecular weights of no greater than 1000. More preferably, monomers with low weight-average molecular weights of between 250 and 600, such as trimethylolpropane triacrylate, pentaerythritol triacrylate, pentaerythritol tetraacrylate, dipentaerythritol pentaacrylate, dipentaerythritol hexaacrylate and their modified products, are suitable because they are easily impregnated.

The weight-average molecular weight according to the invention is determined in terms of polystyrene, based on measurement by gel permeation chromatography (GPC) with a THF solvent.

The impregnation layer can be judged, for example, by observing the cross-section of the organic fine particles (A2) in the diffusion layer using an electron microscope (preferably a transmission type such as TEM or STEM), and the impregnation layer may be easily observable by being dyed.

The radiation curable translucent resin to be impregnated in the impregnation layer may be impregnated with all of the constituent components, or it may be impregnated only with some of the constituent components.

When the diffusion layer contains particles (B) other than these organic fine particles, the mean particle size (B2) of the particles (B) in the diffusion layer is preferably smaller than the mean particle size of the organic fine particles (A2). This is because high raised sections will be formed on the surface of the diffusion layer at locations corresponding to the fine particles (B), potentially making it impossible to adequately minimize discoloration.

The particles (B) also preferably have an impregnation layer, in order to more reliably prevent formation of high raised sections due to the particles (B).

Also, preferably the following inequality is satisfied, where P (μm) is the thickness of the impregnation layer of the organic fine particles (A) and R (μm) is the radius of the organic fine particles.

$$5\%<P/R<40\%$$

If the ratio is 5% or smaller, the effect obtained by forming the impregnation layer will not be sufficient, and if it is 40% or greater, formation of raised sections on the antiglare layer surface will be insufficient, and not only will the antiglare property for dynamic images be inferior, but the internal diffusing function of the organic fine particles (A2) will not be adequately exhibited, making it impossible to obtain a satisfactory effect of preventing glare.

The P/R ratio is the average value of the thickness of the impregnation layer in a cross-section of the organic fine particles (A), obtained with an electron micrograph of a cross-section of the antiglare sheet, divided by the average value of the radius, based on an electron micrograph of the organic fine particles.

Specifically, a cross-section of the diffusion layer may be observed with an electron microscope (preferably a transmission type such as TEM or STEM) at 3000 to 50,000×, at 5 arbitrary locations that definitely include at least one fine particle of the impregnation layer, and after photographing, the thickness of the impregnation layer may be measured at two points for each fine particle, and the value of the average of the 10 measured values calculated. Measurement of the thickness of the impregnation layer is accomplished by selecting two sections where the border between the fine particles and the translucent resin around the fine particle is relatively distinct, and where impregnation is maximal.

Here, the organic fine particles, as diffusion particles, generally have a crosslinked structure, but the degree of swelling by the radiation curable translucent resin or solvent will differ depending on the degree of crosslinking, in most cases with a higher crosslinking degree resulting in lower swelling and a lower crosslinking degree resulting in higher swelling. Consequently, when the material composing the organic fine particles (A2) is the aforementioned crosslinked acrylic resin, for example, the thickness of the impregnation layer can be controlled to the desired range by appropriately adjusting the degree of crosslinking of the crosslinked acrylic resin.

In the antiglare sheet of the invention, the organic fine particles (A1) used may be ones obtained by, for example, pre-forming an antiglare sheet with a coating solution employing organic fine particles with different crosslinking degrees, and selecting organic fine particles conforming to a suitable extent of swelling.

The terms "high crosslinking" and "low crosslinking" will be used below, where "high crosslinking" and "low crosslinking" are as defined below.

A coating solution is prepared by mixing a mixture of toluene and methyl isobutyl ketone (weight ratio: 7:3) at 190 parts by weight with respect to 100 parts by weight of a radiation curable translucent resin (a mixture of 60 parts by weight of pentaerythritol tetraacrylate (PETTA, product name: M-450, product of Toagosei Co., Ltd.), 10 parts by weight of dipentaerythritol hexaacrylate (DPHA, product of Nippon Kayaku Co., Ltd.) and 30 parts by weight of isocyanuric acid PO-modified triacrylate (product name: M-313, product of Toagosei Co., Ltd.)).

The fine particles are immersed in the obtained coating solution and immediately placed on slide glass with a dropper, after which a cover glass is placed thereover. This is observed with an optical microscope and the mean particle size $d_0$ (average value of 20 fine particles) is determined. Observation with an optical microscope is also made in the same manner at 24 hours after immersion, and the mean particle size $d_{24}$ is determined. Fine particles wherein the rate of change of the particle size $((d_{24}-d_0)/d_0)$ determined in this manner is 5% or greater are defined as "low crosslinked", and fine particles wherein it is less than 5% are defined as "high-crosslinked".

There are no particular restrictions on the content of the organic fine particles (A1) in the coating solution, but it is preferably 0.5 to 30 parts by weight with respect to 100 parts by weight of the radiation curable translucent resin described below. If it is less than 0.5 part by weight it will not be possible to form sufficient irregular shapes on the surface of the diffusion layer, and the antiglare sheet of the invention will have an inadequate antiglare property for dynamic images.

If it is greater than 30 parts by weight, on the other hand, aggregation will occur between the organic fine particles (A1) in the coating solution, large raised sections may be formed on the surface of the diffusion layer making it impossible to obtain the desired performance, and discoloration or glare may be produced.

A more preferred lower limit for the content of the organic fine particles (A1) is 1.0 part by weight, and a more preferred upper limit is 20 parts by weight. This range will allow the aforementioned effect to be more reliably exhibited.

In addition to specifying Q/U, $\text{Log}_{10}$ ($Q_{30}/Q$) and $\text{Log}_{10}$ ($Q_{20}/Q$), the performance of the antiglare sheet for a liquid crystal display device used on the surface of a liquid crystal display unit can be further improved by careful selection of the relationship between the thickness T of the antiglare layer, the total haze Ha (%) of the antiglare sheet for a liquid crystal display device, the haze Hi (%) produced by internal diffusion, and the diffusion as the sum of interaction between diffusion due to the irregularities on the surface (hereunder also referred to as "external diffusion") and diffusion due to internal diffusion, (Ha–Hi), as well as the combination of translucent resins on the diffusion layer, and the transparent base material resin.

A small internal diffusion will not allow glare to be eliminated. However, since the presence of internal diffusion with a diffusion angle of 2.5 degrees or greater counts as haze Hi produced by internal diffusion, it is necessary to have a suitable amount of internal diffusion even if Hi is zero. However, excessively large diffusion at a large diffusion angle, i.e. internal haze Hi counted as haze, lowers the resolution and significantly reduces contrast due to lower blackness in dark surroundings as a result of generated stray light components, while also further impairing the crispness.

Although contrast is reduced, an internal haze of 3.0 or greater can improve the black tightness due to a viewing angle widening effect.

The fundamental concept of the present invention is based on knowledge that the total haze is not the sum of internal diffusion and surface diffusion as understood according to the prior art, but rather that the total haze is affected by the positional relationship of the diffusion factors, in addition to internal diffusion and surface diffusion, or in other words, the total haze is internal haze+external haze+haze due to the interaction between internal diffusion factors and surface irregularities.

Consequently, if the haze of the antiglare sheet for a liquid crystal display device is represented as Ha and the haze produced by internal diffusion is represented by Hi, then Ha –Hi may be considered to be the sum of external haze and haze due to interaction b therewith the internal diffusion factors and surface irregularities.

When viewing dynamic images, a lower haze (Ha–Hi) is preferred since vivid complexion and blackness is desirable to realize high image quality for the dynamic images, and the antiglare property for dynamic images is sufficient if the borders of virtual images are only slightly visible. Also, since haze is not counted as haze when the diffusion angle is less than 2.5 degrees, even if the haze (Ha–Hi) is zero which has conventionally been considered unsuitable, the Q/U value need only be within the desired range, more preferably between 0% and 4% and even more preferably between 0% and 2%.

The difference in refractive index between the transparent resin composing the antiglare layer and the diffusion particles is preferably 0.005 to 0.25. If the difference in refractive index is at least 0.005 it will be possible to prevent glare, and if it is no greater than 0.25 the diffuse transmission intensity distribution design will be facilitated. From this viewpoint, the difference in refractive index is preferably 0.01 to 0.2 and more preferably 0.015 to 0.15.

In particular, when the diffusion particles used are organic fine particles with an impregnation layer in which components in the coating solution have penetrated the organic fine particles, and the components in the coating solution have not impregnated to the center sections of the organic fine particles, this is more preferred because the difference in refractive index at the interface between the organic fine particles and the translucent resin will be small, and therefore reflection will be limited thereby minimizing generation of stray light components, while the organic fine particle interiors will have a large difference in refractive index with the translucent resin so that internal diffusion will be maintained, and therefore both stray light component generation and glare can be prevented.

In order to increase the amount of impregnation of the impregnation layer, for example, the crosslink density of the organic fine particles may be lowered, an impregnating solvent may be used therewith, or the coating solution standing temperature may be increased, and the conditions for the preferred amount of impregnation must be set beforehand.

From the viewpoint of controlling the surface irregularities in organic fine particles having such an impregnation layer, the P/R ratio is preferably in the range of 5% to 40%, but from the viewpoint of maintaining internal diffusion performance, the center sections not impregnated with the components of the coating solution preferably have diameters of at least the wavelength of visible light, and more preferably they have diameters of at least 1 μm.

For the diameters of the non-impregnated portions of the center sections, specifically, a cross-section of the diffusion layer may be observed with an electron microscope (preferably a transmission type such as TEM or STEM) at 3000 to 50,000×, at five arbitrary locations that definitely include at least one fine particle of the impregnation layer, and after photographing, the diameter of the non-impregnated portion of the center section may be measured, and the value of the average of the 10 measured values calculated.

Also, the particle sizes and the thickness of the translucent resin over the particles can be determined by observation and measurement carried out by the same methods described above, photographing a cross-section passing near the center of each particle and using the average value.

From the viewpoint of preventing glare, the ratio D of the value with a 2.0 mm optical comb with respect to a 0.125 mm optical comb, as the transmission image clarity of the antiglare sheet based on JIS K7105, is preferably less than 2. The value with a 0.125 mm optical comb represents the size of diffusion near regular transmission (a smaller value indicating greater diffusion), which is a cause of minute distortion of the projected light, or glare. The value with a 2.0 mm optical comb, on the other hand, represents the size of diffusion in a wider range, i.e. the effect of rendering glare unnoticeable, with a larger value indicating a smaller effect. Thus, the transmission image clarity represents poorer glare as the value is smaller with a 0.125 mm optical comb and as the value is higher with a 2.0 mm optical comb. This relationship can therefore be represented by D mentioned above, and glare begins to become noticeable when the value is 2 or greater. The value of D is more preferably less than 1.9, and even more preferably less than 1.4.

The refractive index of the translucent particles is measured by measuring the turbidity with dispersion of equal amounts of the translucent particles in solvents with varying refractive indexes, obtained by varying the mixing ratio with two different solvents having different refractive indexes, measuring the refractive index of the solvent at minimum turbidity using an Abbe refractometer, or by using a Cargille reagent.

Their refractive index can be determined by measuring the material itself, or otherwise it can be measured by removing the particles or fragments of the particles from the film after the antiglare sheet for a liquid crystal display device has been formed, or by measuring a cut surface of the antiglare sheet with an ellipsometer, or by measuring the laser interference of the antiglare sheet.

Also, by using particles with essentially no difference in refractive index from the translucent resin, larger than the visible light wavelength and smaller than the diffusion layer thickness, it is possible to provide surface irregularities alone, which is particularly useful for adjusting interaction between the interior and the surface irregularities. "Essentially no difference in refractive index from the translucent resin" means that the presence of the particles is not visible under optical microscope observation.

In the antiglare sheet of the invention, the radiation curable translucent resin as the translucent resin comprises a (meth)acrylate monomer as an essential component.

Such a radiation curable translucent resin may be one that swells the organic fine particles (A1), with transparent ones being preferred, and examples include ionizing radiation-curable resins that cure by ultraviolet rays or an electron beam. Throughout the present specification, the term "(meth)acrylate" refers to methacrylate and acrylate.

Also throughout the present specification, the term "monomer" includes all molecules that cure with ionizing radiation to form a polymer film and that can serve as structural units of the basic structure of the polymer film, and it is one having an unsaturated bond.

In other words, oligomers and prepolymers are also included, if they are base units of a cured film.

According to the invention, the low-molecular-weight monomer with an impregnating property has a weight-average molecular weight of preferably no greater than 1000 and more preferably 250 to 600.

The functional groups of the monomer, oligomer and prepolymer are preferably ionizing radiation-polymerizable, and are especially photopolymerizable functional groups.

As photopolymerizable functional groups there may be mentioned unsaturated polymerizable functional groups such as (meth)acryloyl, vinyl, styryl and allyl.

As prepolymers and oligomers there may be mentioned acrylates such as urethane (meth)acrylate, polyester (meth)acrylate and epoxy (meth)acrylate, and unsaturated polyesters, epoxy resins and the like.

Monomers include styrene-based monomers such as styrene and α-methylstyrene; acrylic monomers such as methyl (meth)acrylate, 2-ethylhexyl (meth)acrylate, pentaerythritol (meth)acrylate, pentaerythritol tri(meth)acrylate, pentaerythritol tetra(meth)acrylate, pentaerythritolethoxy tetra(meth)acrylate, dipentaerythritol hexa(meth)acrylate, dipentaerythritol penta(meth)acrylate, trimethylolpropane tri(meth)acrylate, trimethylolpropaneethoxy tri(meth)acrylate, glycerin propoxy triacrylate, ditrimethylolpropane tetraacrylate, polyethyleneglycol di(meth)acrylate, bisphenol F EO-modified di(meth)acrylate, bisphenol A EO-modified di(meth)acrylate, isocyanuric acid EO-modified di(meth)acrylate, isocyanuric acid EO-modified tri(meth)acrylate, polypropyleneglycol di(meth)acrylate, trimethylolpropane PO-modified tri(meth)acrylate, trimethylolpropane EO-modified tri (meth)acrylate and ditrimethylolpropane tetra(meth) acrylate; polyol compounds having 2 or more thiol groups in the molecule, such as trimethylolpropane trithioglycolate, trimethylolpropane trithiopropylate and pentaerythritol tetrathioglycol, and urethane (meth)acrylates or polyester (meth)acrylates having 2 or more unsaturated bonds.

Polyfunctional acrylates are particularly preferred, among which pentaerythritol tri(meth)acrylate, pentaerythritol tetra (meth)acrylate, dipentaerythritol hexa(meth)acrylate and dipentaerythritol penta(meth)acrylate are more preferred.

As translucent resins there may be used polymers added to the resin composition. Polymethyl methacrylate (PMMA) and cellulose acetate propionate (CAP) are examples of such polymers.

Addition of a polymer allows the viscosity of the coating solution to be adjusted, and this is advantageous in that it can facilitate coating while also facilitating modification of irregular shapes formed by particle aggregation and allowing sinking of the particles to be controlled, while it can also control interaction between surface diffusion and internal diffusion and surface irregularities. The preferred weight-average molecular weight of the polymer is 20,000 to 100,000. If it is less than 20,000, it will be necessary to increase the amount of addition in order to adjust the viscosity, potentially lowering the hardness of the antiglare layer, and if it is 100,000 or greater the viscosity will be too high, potentially lowering the curing property, while the presence of a compound with an excessively high weight-average molecular weight in the composition can inhibit crosslinking during the curing reaction and potentially lower the hardness.

A photoradical polymerization initiator may also be added to the resin composition if necessary. As photoradical polymerization initiators there may be used acetophenones, benzoins, benzophenones, phosphine oxides, ketals, anthraquinones, thioxanthones, azo compounds and the like.

As acetophenones there may be mentioned 2,2-dimethoxyacetophenone, 2,2-diethoxyacetophenone, p-dimethylacetophenone, 1-hydroxy-dimethylphenyl ketone, 1-hydroxy-dimethyl-p-isopropylphenyl ketone, 1-hydroxycyclohexylphenyl ketone, 2-methyl-4-methyl-thio-2-morpholinopropiophenone, 2-benzyl-2-dimethyl-amino-1-(4-morpholinophenyl)-butanone, 4-phenoxydichloroacetophenone and 4-t-butyl-dichloroacetophenone, and as benzoins there may be mentioned benzoin, benzoinmethyl ether, benzoinethyl ether, benzoinisopropyl ether, benzyldimethylketal, benzoinbenzenesulfonic acid ester, benzointoluenesulfonic acid ester, benzoinmethyl ether, benzoinethyl ether and the like.

As benzophenones there may be used benzophenone, hydroxybenzophenone, 4-benzoyl-4'-methyldiphenyl sulfide, 2,4-dichlorobenzophenone, 4,4-dichlorobenzophenone and p-chlorobenzophenone, 4,4'-dimethylaminobenzophenone (Michler's ketone), 3,3',4,4'-tetra(t-butylperoxycarbonyl)benzophenone, and the like.

A photosensitizer may also be used therewith in combination, specific examples of which include n-butylamine, triethylamine and poly-n-butylphosphine.

Furthermore, addition of a compatible polymer to the ionizing radiation curable resin or thermosetting resin, or addition of fine particles that are no larger than the light wavelength, such as fine particles that are no larger than 100 nm, as a filler, can cause the resin to undergo polymerization shrinkage along the fine particles during curing, so that the shapes of the fine particles are significantly reflected in surface irregularities and the inclination angle of the irregularities increase, but it is possible to reduce polymerization shrinkage at this time and reduce the inclination angle of the antiglare layer surface, and result in a smoother irregular shape overall, so that suitable external diffusibility can still be obtained.

Furthermore, addition of fine particles that are no larger than 100 nm, and have a high refractive index or low refractive index, to the ionizing radiation curable resin or thermosetting resin will modify the refractive index of the transparent resin to allow control of internal diffusion.

However, when an organosilane is included in the translucent resin, cohesion of the particles will vary considerably depending on the combination of the resin in the coating solution, the solvent system and the lipophilicity/hydrophilicity of the particles, resulting in unstable optical characteristics, and therefore it is preferred to avoid using an organosilane.

The reason for this is conjectured to be that, even with one type of particle, differences in volatility of solvents (two or more usually being present) produces changes in the composition during drying, making it difficult to control aggregation and dispersion. This is particularly notable when using two or more different types of particles with different degrees of lipophilicity or hydrophilicity. It can therefore become impossible to control roughness and glare at points where steep irregularities form.

A solvent will usually be added to the radiation-curing resin composition to adjust the viscosity or to allow dissolution or dispersion of each of the components. The type of solvent used will not only result in a different impregnation layer thickness of the organic fine particles, but will also alter the surface condition of the coating film in the coating and drying steps, and it is therefore preferably selected as appropriate in consideration of allowing adjustment of the transmission intensity distribution by external diffusion.

Specifically, it is selected in consideration of the saturation vapor pressure and permeability into the transparent base material.

Adjusting the amount of impregnation of the low-molecular-weight components in the coating solution into the transparent base material allows control of the thickness of the antiglare layer, while impregnation into the transparent base material causes the base material surface to become soft and to have a function of absorbing cure shrinkage of the antiglare layer, such that it becomes possible to achieve modification of the shapes of the surface irregularities, as mentioned above. This method is particularly effective when the transparent base material is a cellulose-based resin.

Furthermore, by using a solvent that is capable of being impregnated into particles, it will be easier for at least some of the transparent resin component to permeate into the particles, and the impregnation layer can be adjusted, thereby allowing control of the diffusion transmission intensity.

The radiation curable translucent resin, as the translucent resin, and the solvent, may both be selected as ones that swell the organic fine particles (A1), but it is sufficient if only one is selected that swells the organic fine particles (A1).

Since formation of the impregnation layer of the organic fine particles (A1) can be more reliably accomplished if a solvent is present having the property of swelling the organic fine particles (A1), regardless of the swelling property of the radiation curable translucent resin, it is more preferred for at least the solvent to include a solvent having the property of swelling the organic fine particles (A1).

This is believed to be because, first, the solvent acts on the organic fine particles (A1) causing the organic fine particles (A1) to swell, and then the low-molecular-weight component in the radiation curing translucent resin becomes impregnated therein.

In the antiglare film of the invention, the combination of the radiation curable translucent resin and the solvent is preferably a combination of a (meth)acrylate monomer as the radiation curable translucent resin, since the molecular weight is low and it is readily impregnatable, and a ketone or ester-based solvent with a powerful property of swelling the organic fine particles (A1).

Also, by using the solvent in admixture, the degree of swelling of the organic fine particles (A1) can be adjusted to allow control of the amount of impregnation of the low-molecular-weight components in the radiation curable translucent resin.

The solvent may be appropriately selected in consideration of the aforementioned explanation, and specifically there may be mentioned aromatic solvents such as toluene and xylene, and ketones such as methyl ethyl ketone (MEK), methyl isobutyl ketone (MIBK) and cyclohexanone, which may be used alone or in combinations of two or more.

It is preferred to use a mixture of at least one type of aromatic solvent and at least one type of ketone. To control the drying speed, there may be combined therewith a cellosolve such as methylcellosolve or ethylcellosolve, a cellosolve acetate, or an alcohol such as ethanol, isopropanol, butanol or cyclohexanol.

Additives other than translucent particles may also be added to the translucent resin, or transparent resin, in the antiglare sheet for a liquid crystal display device of the invention, as necessary.

For example, various inorganic particles may be added to improve the optical characteristics, including the physical properties such as hardness, and the reflectance and diffusibility.

As inorganic particles there may be mentioned metals such as zirconium, titanium, aluminum, indium, zinc, tin and antimony, and metal oxides such as $ZrO_2$, $TiO_2$, $Al_2O_3$, $In_2O_3$, $ZnO$, $SnO_2$, $Sb_2O_3$, ITO, ATO or $SiO_2$. Also included are carbon, MgF, silicon, $BaSO_4$, $CaCO_3$, talc, kaolin, smectite and the like.

The particle sizes of the inorganic particles are preferably as micronized as possible in the resin composition during coating of the antiglare layer, in order to minimize the effect on the diffuse transmission intensity distribution, and the mean particle size is preferably in a range of no greater than 100 nm. By micronizing the inorganic particles to no greater than 100 nm, it is possible to form an antiglare sheet for a liquid crystal display device that does not impair the transparency. The particle sizes of the inorganic particles can be measured by the light scattering method or using an electron micrograph.

According to the invention, various surfactants may be used for an anti-aggregation effect and anti-settling effect, as well as to improve the properties such as the leveling property.

As surfactants there may be mentioned silicone oils, fluorine-based surfactants, and fluorine-based surfactants, preferably containing perfluoroalkyl groups. When the resin composition containing the solvent is coated and dried, a difference in surface tension is produced between the membrane surface and the inner surface in the coated film, whereby multiple convection currents are created within the film. The convection currents result in orange peel or coating defects in a Benard cell structure.

This also adversely affects the vivid complexion and blackness and the image crispness. When such a surfactant is used it is possible to prevent such convection currents, thus resulting not only in a concavoconvex film without defects or irregularities, but also facilitating adjustment of the transmission scattering and luminance properties.

According to the invention there may also be added stain-proofing agents, antistatic agents, coloring agents (pigments and dyes), flame retardants, ultraviolet absorbers, infrared absorbers, tackifiers, polymerization inhibitors, antioxidants, surface modifiers and the like.

The transparent base material used in the antiglare sheet for a liquid crystal display device of the invention is not particularly restricted so long as it is one that is commonly used in antiglare sheets for liquid crystal display devices, and it may be a transparent resin film, transparent resin plate, transparent resin sheet, transparent glass panel, or the like.

As transparent resin films there may be used triacetyl cellulose films (TAC films), diacetyl cellulose films, acetylbutyl cellulose films, acetylpropyl cellulose films, cyclic polyolefin films, polyethylene terephthalate films, polyethersulfone films, polyacrylic-based resin films, polyurethane-based resin films, polyester films, polycarbonate films, polysulfone films, polyether films, polymethylpentene films, polyetherketone films, (meth)acrylonitrile films, polynorbornane-based resin films and the like.

In particular, in addition to facilitating smoothness of the surface irregularities due to the impregnating property, a TAC film is preferred when the antiglare sheet for a liquid crystal display device of the invention is to be used together with a polarizing plate, since it does not interfere with polarized light, a cyclic polyolefin film is preferred for weather resistance, and a polyester film such as a polyethylene terephthalate film is preferred if emphasis is on mechanical strength and smoothness.

The transparent base material may be a multilayer or monolayer material, and a primer layer may also be provided on the surface for adhesion with the coating film.

Also, in order to prevent interference patterns produced at the interface when a substantial difference in refractive index exists between the transparent base material and coating film layer, for example, an anti-interference pattern layer with a refractive index intermediate between that of the transparent base material and the coating film layer may be provided between them, or irregularities of about 0.3 to 1.5 µm may be formed as surface roughness (ten-point height of irregularities: Rz), in addition to using a coating solution that impregnates the transparent base material.

Rz is the value measured with a cutoff value of 2.5 mm and an evaluating speed of 0.5 mm/s, based on the method of JIS B0601 1994.

Functions such as a hard coat property, prevention of unwanted reflection, anti-reflection, an antistatic property or an antifouling property may be imparted to the antiglare sheet for a liquid crystal display device of the invention. The hard coat property is usually evaluated based on the pencil hardness (measured according to JIS K5400), or by a 10-pass abrasion test using steel wool #0000 under a load, evaluating the maximum load under which no damage is observed with black tape attached to the back side (steel wool scuff resistance).

The pencil hardness of the antiglare sheet for a liquid crystal display device of the invention is preferably H or greater, and more preferably 2H or greater.

For the steel wool scuff resistance, the maximum load where no damage was observed even with a 10-pass abrasion test is preferably 200 g/cm$^2$ or greater, more preferably 500 g/cm$^2$ or greater and most preferably 700 g/cm$^2$ or greater.

Antistatic performance is preferably imparted from the viewpoint of preventing static electricity on the surface of the antiglare sheet for a liquid crystal display device.

To impart antistatic performance, there may be mentioned methods known in the prior art, such as a method of coating a conductive coating solution comprising conductive fine particles, a conductive polymer, a quaternary ammonium salt, thiophene or the like and a reactive curing resin, or a method of forming a conductive thin-film by vapor deposition or sputtering of a metal or metal oxide that forms a transparent film.

The antistatic layer may also be used as a portion of a functional layer, such as for hard coating, prevention of unwanted reflection, anti-reflection or the like.

The surface resistance value is an index of the antistatic property, and according to the invention the surface resistance value is preferably no greater than $10^{12} \Omega$/sq., more preferably no greater than $10^{11} \Omega$/sq. and especially no greater than $10^{10} \Omega$/sq.

The "saturated electrostatic voltage", or the maximum voltage at which the optical film can accumulate, is preferably no greater than 2 kV at an applied voltage of 10 kV.

An antifouling layer may also be provided on the outer surface of the antiglare sheet for a liquid crystal display device of the invention. An antifouling layer lowers the surface energy and inhibits adhesion of hydrophilic or lipophilic contaminants.

The antifouling layer can be imparted by adding a stain-proofing agent, and as stain-proofing agents there may be mentioned fluorine-based compounds, silicon-based compounds and their mixtures, among which fluoroalkyl group-containing compounds are particularly preferred.

A low refractive index layer with a lower refractive index than the surface layer, with a low refractive index layer laminated on the surface, may additionally be provided on the outer surface of the antiglare sheet for a liquid crystal display device of the invention.

The low refractive index layer is a layer with a thickness of about 0.1 μm, and it further lowers the reflection of external light by interference. The low refractive index layer is not restricted but is preferably formed by coating and curing a coating solution containing an ultraviolet curing resin to which porous or hollow silica has been added. By coating and curing the coating solution, the fine, sharp irregularities present as raised sections of the antiglare layer surface become smoothed, so that even more improved vivid complexion and blackness can be achieved in addition to an anti-reflection effect.

The antiglare sheet for a liquid crystal display device of the invention is produced by coating the resin composition that is to form the antiglare layer with an irregular form on the outermost surface, on a transparent base material.

The coating method may be any of various known methods, such as dip coating, air knife coating, curtain coating, roll coating, wire bar coating, gravure coating, die coating, blade coating, microgravure coating, spray coating, spin coating or reverse coating, for example.

According to the invention, the transmission scattering luminance property varies depending on the coating amount, and therefore roll coating, gravure coating, die coating or reverse coating is preferred, as such methods can facilitate stably obtaining a range of 3.0 to 10.0 μm for the sum of the thicknesses of the layer having a diffusion factor in the interior, and the transparent resin layer.

The coating solution is preferably allowed to stand for a prescribed period of time before forming the diffusion layer.

This is because when the antiglare layer is formed without preparing the coating solution and allowing it to stand, it may not be possible to form a sufficient impregnation layer on the organic fine particles (A2) in the diffusion layer even after appropriately adjusting the crosslinking degree of the organic fine particles (A) used, or the degree of swelling of the organic fine particles (A) with the radiation curable translucent resin and/or solvent.

The standing time for the coating solution may be appropriately varied depending on the type, crosslinking degree and particle size of organic fine particles (A) used, and the type of radiation curable translucent resin and/or solvent, but it is preferably about 12 to 48 hours, for example.

After coating by any of the aforementioned methods, the sheet is transported into a heated zone to dry the solvent, or another known method is used to dry the solvent. By selecting the relative evaporation rate of the solvent, the solid concentration, the coating solution temperature, the drying temperature, the drying air speed, the drying time and the dry zone solvent atmosphere concentration, it is possible to adjust the external diffusion due to the profile of the surface irregularity shapes, and the internal diffusion due to the translucent particles or additives.

A method of adjusting the transmission scattering luminance property by selection of the drying conditions is particularly preferred and convenient. Specifically, the drying temperature is preferably 30° C. to 120° C. and the drying wind speed is 0.2-50 m/s, as the transmission scattering luminance property can be controlled with appropriate adjustment in this range.

More specifically, controlling the type of solvent and the drying temperature allows adjustment of the permeability of the resin and the solvent into the base material. That is, by controlling the drying temperature, given the same solvent conditions, it is possible to adjust the permeability of the resin and solvent into the base material, and as explained above, this is linked with control of the form of surface irregularities.

[Evaluation Methods]

1. Film Thickness: T (μm) Measurement Method

A confocal microscope (LeicaTCS-NT, product of Leica Microsystems GmbH, objective lens, 10-100× magnification) was used for observation of a cross-section of the antiglare sheet, and the presence or absence of an interface was evaluated on the following scale.

Measurement Procedure (1) In order to obtain clear images without halation, observation was made using a wet objective lens in a confocal microscope, placing approximately 2 ml of oil with a refractive index of 1.518 on the optical laminate. The oil was used to eliminate the air layer between the objective lens and the antiglare layer.

(2) The film thickness from the base material was measured at a maximum height and minimum recess in the irregularities in a single screen, at 1 point each for a total of 2 points, measuring 5 screens for a total of 10 points, and the mean value was calculated as the coating film thickness. In cases where the interface is not distinct under the confocal microscope, a cross-section of the antiglare sheet for a liquid crystal display device can be prepared with a microtome and observed with an electron microscope, and the film thickness can be calculated in the same manner as (2) above.

2. Total Haze: Ha (%) Measurement Method

The total haze value can be measured according to JIS K-7136. The device used for measurement was an HM-150 haze meter (Murakami Color Research Laboratory Co., Ltd.). The haze is measured with the transparent base material surface facing the light source.

3. Internal Haze: Hi (%) Measurement Method

The internal haze used for the invention was determined in the following manner. The irregularities on the outermost surface on the observer side of the antiglare sheet for a liquid crystal display device were coated with a resin having a refractive index equivalent to that of the resin forming the surface irregularities, or at least with a difference in refractive index of no greater than 0.02, and with the fine particles removed from the examples and comparative examples for the present invention, using a wire bar for coating to a dry film thickness of 8 µm, and after drying at 70° C. for 1 minute, it was irradiated with ultraviolet rays at 100 mj/cm$^2$ for curing.

This crushes the irregularities on the surface to form a flat surface. However, when the presence of a leveling agent in the composition used to form the antiglare layer with an irregular shape causes cissing of the recoating agent and inhibits wetting, the antiglare sheet for a liquid crystal display device may be pretreated with hydrophilic treatment by saponification (immersion in a 2 mol/l NaOH (or KOH) solution at 55° C. for 3 minutes, followed by rinsing and complete removal of water droplets with a Kimwipe, and then 1 minute of drying in an oven at 50° C.). The surface-flattened sheet has only internal haze, because it has no surface irregularities and no interaction.

The haze of the sheet can be measured by the same method as for the total haze according to JIS K-7136, and determined as the internal haze.

4. Measurement of Regular Transmission Intensity Q, Virtual Regular Transmission Intensity U, $Q_{20}$ and $Q_{30}$.

This was measured for each of the antiglare sheets for a liquid crystal display device fabricated in the production examples, by the methods described throughout the present specification.

5. Evaluation of Images

The polarizing plate on the outer surface of a "KDL-40 P 2500" liquid crystal television by Sony Corporation was released and a polarizing plate without surface coating was attached.

Next, a sample produced by each production example was attached thereover with the antiglare layer side as the outer surface, using a transparent pressure-sensitive adhesive film for an optical film (product with total light transmittance: ≥91%, haze: ≤0.3%, film thickness: 20 to 50 µm, such as one of the MHM Series by Nichiei Kakoh Co., Ltd.).

The liquid crystal television was set in a room in an environment with an illuminance of about 1,000 Lx, the DVD "Phantom of the Opera" by Media Factory, Inc. was displayed thereon, and the image was viewed by 15 subjects from a location about 1.5-2.0 m distant from the liquid crystal television, at different vertical and horizontal angles, for sensation evaluation of the following properties, each on a 3-level scale. The evaluation levels were as follows.

(1) Vivid complexion and blackness: For display of dynamic images, this was judged based on high contrast (black glaze and black tightness), with stereoscopic visual effect, gloss and brightness in the image, and sense of motion.

Stereoscopic Visual Effect
G: Evaluation of "satisfactory" by at least 10 individuals.
F: Evaluation of "satisfactory" by 5-9 individuals.
P: Evaluation of "satisfactory" by 4 or fewer individuals.
Sense of Motion
G: Evaluation of "satisfactory" by at least 10 individuals.
F: Evaluation of "satisfactory" by 5-9 individuals.
P: Evaluation of "satisfactory" by 4 or fewer individuals.
Vivid Complexion and Blackness
G: Evaluation of G or greater for both stereoscopic visual effect and sense of motion.
F: Evaluation of G and F, or both F, for stereoscopic visual effect and sense of motion.
P: Evaluation of P for stereoscopic visual effect and sense of motion.

(2) Antiglare property for dynamic images: For display of dynamic images, this was judged based on excellent prevention of unwanted reflection (a condition without disturbance by virtual images of the observer or observer background), and visibility of dynamic images. A condition of acceptable virtual images of the observer or observer background is a condition in which the presence of the observer is visible but the outlines are indistinctly halated, and the presence of background objects is also visible but the outlines or borders are indistinct. It is also a condition in which, when the background is a white wall, the presence of the white wall is visible but the whiteness is halated and the borders of the wall are indistinct. Thus, simple halation of the outlines results in virtual images becoming no inconvenience for the observer. The antiglare property differs from the conventional "antiglare property", which is a condition with complete absence of unwanted reflection of observers and backgrounds, and total halation and obscurity.
G: Evaluation of "satisfactory" by at least 10 individuals.
F: Evaluation of "satisfactory" by 5-9 individuals.
P: Evaluation of "satisfactory" by 4 or fewer individuals.

(3) Glare: This was judged based on whether glare was in an acceptable range during display of still images.
G: At least 10 individuals responded that glare was in an acceptable range.
F: 5-9 individuals responded that glare was in an acceptable range.
P: 4 or fewer individuals responded that glare was in an acceptable range.

(4) Black tightness: The liquid crystal television was evaluated for blackness during power-off and blackness (black images) during power-on, as viewed directly from the front. The result was expressed as the degree of blackness.
G: Evaluation of "satisfactory" by at least 10 individuals.
F: Evaluation of "satisfactory" by 5-9 individuals.
P: Evaluation of "satisfactory" by 4 or fewer individuals.

(5) Black glaze: A material comprising an antiglare sheet for a liquid crystal display device attached to a black acrylic board using a transparent pressure-sensitive adhesive film for an optical film, was placed on a horizontal plane and a visual sense evaluation was conducted by 15 viewers from the regular reflection direction on a 45 degree-incident plane with the triple wavelength tube lit, judging whether or not glazed black could be reproduced.
G: Evaluation of "satisfactory" by at least 10 individuals.
F: Evaluation of "satisfactory" by 5-9 individuals.
P: Evaluation of "satisfactory" by 4 or fewer individuals.

(6) Blackness in dark surroundings: The liquid crystal television was set in a room in an environment with an illuminance of no greater than 5 Lx, a black screen was displayed, and the image was viewed by 15 subjects from a location about 1.5-2.0 m distant from the liquid crystal television, at different vertical and horizontal angles, for sensation evaluation of the following properties, each on a 3-level scale. The black screen was displayed on the screen of an externally connected laptop computer (Sony VAIO), with the entire background color set to "black". The evaluation criteria were as follows, with the most frequent evaluation result recorded as the final result. Black display in dark surroundings was judged by whether or not gray was present and black could be seen without the impression of opalescence.

G: Evaluation of "satisfactory" by at least 10 individuals.
F: Evaluation of "satisfactory" by 5-9 individuals.
P: Evaluation of "satisfactory" by 4 or fewer individuals.

6. Ratio D of Value of Transmission Image Clarity with 2.0 Mm Optical Comb with Respect to 0.125 mm Optical Comb.

The values of the transmission image clarity of the antiglare sheet based on JIS K7105 with 0.125 mm and 2.0 mm optical combs were determined and the ratio was calculated. The measuring instrument used was an ICM-1T image clarity meter (Suga Test Instruments Co., Ltd.).

7. Thickness of Impregnation Layer

The antiglare films obtained in the examples and comparative examples were cut in the thickness direction of the diffusion layer, a cross-section containing at least one organic fine particle (A) as a diffusion particle was observed with a transmission electron microscope (STEM) at 3000 to 50,000 magnification, and the thickness was measured at two points at the sections where the radiation curable translucent resin is impregnating the organic fine particles (A), with relatively distinct borders between the organic fine particles (A) and the surrounding translucent resin, and where the radiation curable translucent resin was maximally impregnating the organic fine particles (A), the measurement being carried out in the same manner for a total of five organic fine particles (A), calculating the average value of the 10 measurement results.

EXAMPLES

The invention will now be explained in greater detail by examples, with the understanding that the invention is in no way limited by the examples.

Example 1

Triacetyl cellulose (80 µm thickness, FujiFilm Corp.) was prepared as a transparent base material.

Next, using a mixture of 60 parts by weight of pentaerythritol tetraacrylate (PETTA, product name: M-450 by Toagosei Co., Ltd.), 10 parts by weight of dipentaerythritol hexaacrylate (DPHA by Nippon Kayaku Co., Ltd.) and 30 parts by weight of isocyanuric acid PO-modified triacrylate (product name: M-313 by Toagosei Co., Ltd.) as a radiation curable translucent resin (translucent resin) (refractive index: 1.51), there were mixed therewith acrylic particles (refractive index: 1.49, mean particle size: 5.0 µm) as organic fine particles (A) (diffusion particles) at 9.0 parts by weight with respect to 100 parts by weight of the radiation curable translucent resin, and then a mixture of toluene and methyl isobutyl ketone (weight ratio: 7:3) as a solvent at 190 parts by weight with respect to 100 parts by weight of the radiation curable translucent resin, the polymerization initiator IRGACURE 184 (product of BASF Japan) and the leveling agent polyether-modified silicone (TSF4460, product of Momentive Performance Materials, Inc.) at 5 parts by weight and 0.04 part by weight, respectively, with respect to 100 parts by weight of the radiation curable translucent resin, to prepare a coating solution.

After allowing the obtained coating solution to stand for 24 hours, a Meyer bar was used for coating on an optically transparent base material, dry air at 70° C. was streamed in at a rate of 1.2 m/s for 1 minute of drying.

The coating film was then irradiated with ultraviolet rays (200 mJ/cm² under a nitrogen atmosphere) to cure the radiation curable translucent resin and form a diffusion layer, thereby fabricating an antiglare sheet.

Examples 2 to 10

Antiglare films were fabricated in the same manner as Example 1, except that the components added to the coating solution and the conditions were as listed in Table 1. When using two different particles, the amount of particles (B) added was 30% of the amount of particles (A) added. The impregnation percentage of particles (B) was determined based on the measurement of particles (A).

Comparative Examples 1 to 7

Antiglare sheets were fabricated in the same manner as Example 2, except that the components added to the coating solution and the conditions were as listed in Table 1.

TABLE 1

| | Particles (A) | Binder | Particles (B) | Solvent | Standing (time) | Particles (B) impregnation % | Antiglare layer thickness (µm) | P/R (%) | R/T | Q/U | $\text{Log}_{10}(Q_{30}/Q)$ | $\text{Log}_{10}(Q_{20}/Q)$ | Hi | Ha-Hi | D |
|---|---|---|---|---|---|---|---|---|---|---|---|---|---|---|---|
| Ref. Ex. | A | Q | — | Y | 72 | — | 7.6 | 45 | 0.30 | 34.9 | −10.0 | −10.0 | 0.6 | 0.8 | 2.05 |
| Example 1 | A | P | — | Y | 24 | — | 9.4 | 12 | 0.26 | 10.2 | −10.0 | −10.0 | 2.0 | 1.2 | 1.50 |
| Example 2 | A | Q | — | Y | 24 | — | 8.0 | 18 | 0.30 | 33.6 | −10.0 | −10.0 | 1.8 | 1.5 | 1.54 |
| Example 3 | A | Q | — | Z | 24 | — | 7.1 | 6 | 0.35 | 34.2 | −10.0 | −5.3 | 2.7 | 2.3 | 1.72 |
| Example 4 | A | P | — | Y | 24 | — | 8.1 | 12 | 0.30 | 19.4 | −10.0 | −10.0 | 2.2 | 1.7 | 1.57 |
| Example 5 | A | P | D | Y | 24 | 0 | 8.1 | 12 | 0.30 | 15.5 | −10.0 | −5.0 | 6.4 | 2.0 | 1.91 |
| Example 6 | C | P | E | Y | 24 | 14 | 5.8 | 16 | 0.30 | 21.6 | −10.0 | −6.8 | 6.0 | 1.7 | 1.85 |
| Example 7 | A | Q | D | X | 12 | 0 | 7.0 | 8 | 0.35 | 24.9 | −10.0 | −5.8 | 7.3 | 3.8 | 1.98 |
| Example 8 | A | Q | E | X | 24 | 18 | 6.0 | 20 | 0.40 | 35.3 | −10.0 | −10.0 | 5.5 | 2.8 | 1.89 |
| Example 9 | A | Q | — | Y | 48 | — | 8.6 | 35 | 0.27 | 11.6 | −10.0 | −10.0 | 1.0 | 0.8 | 1.27 |
| Example 10 | A | P | E | Y | 24 | 14 | 8.1 | 12 | 0.30 | 16.5 | −10.0 | −10.0 | 5.7 | 1.9 | 1.86 |
| Comp. Ex. 1 | A | R | — | X | 24 | — | 8.3 | 0 | 0.30 | 9.7 | −6.2 | −5.0 | 4.5 | 1.9 | 1.81 |
| Comp. Ex. 2 | B | P | — | Y | 24 | — | 8.3 | 0 | 0.30 | 8.6 | −10.0 | −4.8 | 3.2 | 1.8 | 1.68 |
| Comp. Ex. 3 | A | R | D | X | 24 | 0 | 8.3 | 0 | 0.30 | 10.1 | −5.9 | −2.8 | 9.1 | 2.1 | 1.81 |
| Comp. Ex. 4 | B | Q | D | | 0 | 0 | 5.3 | 0 | 0.47 | 37.0 | −6.2 | −2.5 | 7.7 | 6.7 | 1.87 |
| Comp. Ex. 5 | A | P | — | Y | 24 | — | 5.3 | 12 | 0.46 | 38.0 | −6.5 | −3.5 | 2.5 | 5.0 | 1.98 |
| Comp. Ex. 6 | A | P | — | Y | 18 | — | 10.6 | 10 | 0.23 | 7.0 | −5.0 | −2.7 | 2.4 | 1.3 | 1.50 |

TABLE 1-continued

|  | Vivid complexion and blackness | Blackness in dark surroundings | Antiglare property for dynamic images | Glare | Glazed blackness | Black tightness |
|---|---|---|---|---|---|---|
| Ref. Ex. | G | G | F | P | G | P |
| Example 1 | F | G | F | G | G | F |
| Example 2 | G | G | G | G | G | F |
| Example 3 | G | F | F | G | F | F |
| Example 4 | G | G | G | G | G | F |
| Example 5 | F | F | G | F | G | G |
| Example 6 | G | G | G | G | G | G |
| Example 7 | G | G | G | F | F | G |
| Example 8 | G | G | F | F | F | G |
| Example 9 | F | G | G | G | G | F |
| Example 10 | G | G | G | G | G | G |
| Comp. Ex. 1 | P | F | P | G | G | G |
| Comp. Ex. 2 | P | F | P | G | G | G |
| Comp. Ex. 3 | F | P | F | G | F | G |
| Comp. Ex. 4 | G | F | P | G | P | G |
| Comp. Ex. 5 | G | F | P | F | P | F |
| Comp. Ex. 6 | P | P | P | G | G | F |

In Table 1, the symbols for the organic fine particles (A), fine particles (B), radiation curable translucent resins and solvents are as follows.
(Fine Particles A)
A: Low-crosslinked acrylic particles (refractive index: 1.49, mean particle size: 5.0 μm)
B: High-crosslinked acrylic particles (refractive index: 1.49, mean particle size: 5.0 μm)
C: Low-crosslinked acrylic particles (refractive index: 1.49, mean particle size: 3.5 μm) (Particles B)
D: High-crosslinked polystyrene particles (refractive index: 1.59, mean particle size: 2.5 μm)
E: Low-crosslinked polystyrene particles (refractive index: 1.59, mean particle size: 2.5 μm)
(Translucent Resin)
P: Mixture of 60 parts by weight of pentaerythritol tetraacrylate (PETTA, product name: M-450, product of Toagosei Co., Ltd.), 10 parts by weight of dipentaerythritol hexaacrylate (DPHA, product of Nippon Kayaku Co., Ltd.) and 30 parts by weight of isocyanuric acid PO-modified triacrylate (product name: M-313, product of Toagosei Co., Ltd.) (refractive index: 1.51).
Q: Pentaerythritol tetraacrylate (PETTA, product name: M-450, product of Toagosei Co., Ltd. (refractive index: 1.51)
R: Mixture of 55 parts by weight of vinyl acetate resin (weight-average molecular weight: 100,000) and 45 parts by weight of methyl methacrylate resin (weight-average molecular weight: 75,000) (refractive index: 1.47).
(Solvent)
X: Mixture of toluene and methyl ethyl ketone (weight ratio: 71:28).
Y: Mixture of toluene and methyl isobutyl ketone (weight ratio: 70:30).
Z: Mixture of toluene and isopropyl alcohol (weight ratio: 75:25).

The results for the antiglare sheets obtained in the examples and comparative examples are shown in Table 1.

As shown in Table 1, it was confirmed that the antiglare sheets of the examples had suitable impregnation layers formed on the organic fine particles (A) in the diffusion layer, and therefore had excellent optical characteristics.

INDUSTRIAL APPLICABILITY

The antiglare sheet for an image display device according to the invention has excellent blackness in dark surroundings and vivid complexion and blackness, and can produce an image display device with an excellent antiglare property for dynamic images.

Furthermore, by using the antiglare sheet it is possible to improve the vivid complexion and blackness and image crispness of an image display device suited for both dynamic images and still images.

EXPLANATION OF SYMBOLS 1. 7. Antiglare sheets
2. 8. Antiglare layers
3. Diffusion particle
4. Translucent resin
5. 9. 11. Transparent base materials
6. 12. Polarizing plates
10. Polarized light layer
13. Glass panel
14. Color filter
15. Transparent electrode
16. Liquid crystal cell
17. Backlight
18. Glass panel (front panel)
19. Display electrode (transparent electrode+path electrode)
20. Transparent dielectric layer
21. MgO
22. Dielectric layer
23. Glass panel (back plate)
24. Address electrode
25. Fluorescent material
26. Plasma display panel (PDP)
27. Front filter
28. Spacer
29. Enclosure
30. Screw
31. Front (display surface)

The invention claimed is:
1. A method for producing an antiglare sheet comprising a step of providing an antiglare layer on at least one side of a transparent base material,
wherein the antiglare layer comprises a translucent resin and diffusion particles,
the antiglare layer has irregularities on the side opposite the transparent base material, the irregularities are formed primarily by raised sections based on the diffusion particles, the diffusion particles have an impregnation layer formed from the impregnation of the translucent resin into the diffusion particles, and the diffusion particles are dispersed in the translucent resin, wherein control is effected so that the antiglare sheet satisfies the following inequalities (8) and (9) to improve blackness in dark surroundings, to improve vivid complexion and blackness, and to prevent an increase of reflection thereby preventing the generation of stray light, $$10<Q/U<36 \tag{8}$$

$$\mathrm{Log}_{10}(Q_{30}/Q)<-6 \tag{9}$$

wherein Q is the transmission intensity in the direction of regular transmission, when visible light rays have been irradiated on the antiglare sheet perpendicular to the transparent base material side, wherein $Q_{30}$ is the transmission intensity in the direction 30 degrees from the direction of regular transmission, and wherein U is the mean value of the transmission intensity determined by extrapolation of a straight line connecting the transmission intensity in the direction +2 degrees from the direction of regular transmission with the transmission intensity in the direction +1 degrees from the direction of regular transmission, and a straight line connecting the transmission intensity in the direction −2 degrees from the direction of regular transmission with the transmission intensity in the direction −1 degrees from the degree of regular transmission, to regular transmission.

2. A method for improving the vivid complexion and blackness and image crispness of an image display device suitable for both dynamic images and still images, wherein the image display device suitable for both dynamic images and still images has on the viewing side of the image display device an antiglare sheet having an antiglare layer comprising a translucent resin and diffusion particles on at least one side of a transparent base material, the antiglare layer having irregularities on the side opposite the transparent base material, the irregularities being formed primarily by raised sections based on the diffusion particles, the diffusion particles having an impregnation layer formed from the impregnation of the translucent resin into the diffusion particles, and the diffusion particles are dispersed in the translucent resin, wherein the method comprises a step of controlling the antiglare sheet so as to satisfy the following inequalities (10) and (11) to improve blackness in dark surroundings, to improve vivid complexion and blackness, and to prevent an increase of reflection thereby preventing the generation of stray light, $$10<Q/U<36 \tag{10}$$

$$\mathrm{Log}_{10}(Q_{30}/Q)<-6 \tag{11}$$

wherein Q is the transmission intensity in the direction of regular transmission, when visible light rays have been irradiated on the antiglare sheet perpendicular to the transparent base material side, wherein $Q_{30}$ is the transmission intensity in the direction 30 degrees from the direction of regular transmission, and wherein U is the mean value of the transmission intensity determined by extrapolation of a straight line connecting the transmission intensity in the direction +2 degrees from the direction of regular transmission with the transmission intensity in the direction +1 degrees from the direction of regular transmission, and a straight line connecting the transmission intensity in the direction −2 degrees from the direction of regular transmission with the transmission intensity in the direction −1 degrees from the direction of regular transmission, to regular transmission.

3. The method for improving the vivid complexion and blackness and image crispness of an image display device according to claim 2, wherein the following inequalities (12) and (13) are satisfied, $$0.25<R/T<0.45 \tag{12}$$

$$5\%<P/R<40\% \tag{13}$$

wherein T is the thickness of the antiglare layer, wherein R is the radius of the diffusion particles in the antiglare layer, and wherein P is the thickness of the impregnation layer.

4. The method for improving the vivid complexion and blackness and image crispness of an image display device according to claim 3, wherein the following inequality (14) is satisfied, $$\mathrm{Log}_{10}(Q_{20}/Q)<-5.5 \tag{14}$$

wherein $Q_{20}$ is the transmission intensity in a direction 20 degrees from the direction of regular transmission, when visible light rays are irradiated perpendicular to the antiglare sheet from the transparent base material.

5. The method for improving the vivid complexion and blackness and image crispness of an image display device according to claim 2, wherein the following inequality (14) is satisfied, $$\mathrm{Log}_{10}(Q_{20}/Q)<-5.5 \tag{14}$$

wherein $Q_{20}$ is the transmission intensity in a direction 20 degrees from the direction of regular transmission, when visible light rays are irradiated perpendicular to the antiglare sheet from the transparent base material.

6. The method for improving the vivid complexion and blackness and image crispness of an image display device according to claim 2, wherein the following inequality (15) is satisfied, $$0 \leq Ha-Hi \leq 4 \tag{15}$$

wherein Hi (%) is the internal haze value of the antiglare sheet and Ha (%) is the total haze value of the antiglare sheet.

7. The method for improving the vivid complexion and blackness and image crispness of an image display device according to claim 2, wherein a low refractive index layer is formed on the uppermost surface layer.

* * * * *